US008682645B2

(12) United States Patent
Taleb et al.

(10) Patent No.: US 8,682,645 B2
(45) Date of Patent: Mar. 25, 2014

(54) SIGNAL ANALYZER, SIGNAL ANALYZING METHOD, SIGNAL SYNTHESIZER, SIGNAL SYNTHESIZING, WINDOWER, TRANSFORMER AND INVERSE TRANSFORMER

(71) Applicant: Huawei Technologies Co., Ltd., Guangdong (CN)

(72) Inventors: Anisse Taleb, Munich (DE); Fengyan Qi, Beijing (CN); Chen Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/862,655

(22) Filed: Apr. 15, 2013

(65) Prior Publication Data

US 2013/0268264 A1 Oct. 10, 2013

Related U.S. Application Data

(63) Continuation of application No. PCT/CN2010/077794, filed on Oct. 15, 2010.

(51) Int. Cl.
*G06F 17/20* (2006.01)

(52) U.S. Cl.
USPC ............... 704/8; 704/503; 704/500; 704/229; 704/219; 704/203; 704/200.1; 704/200; 379/406.12; 375/260; 375/240.16

(58) Field of Classification Search
CPC ... G10L 19/022; G10L 19/025; G10L 19/024; G10L 19/02; G10L 19/26; G10L 19/20
USPC .............. 704/503, 500, 219, 203, 200.1, 200; 379/406.12; 375/260, 240.16
See application file for complete search history.

(56) References Cited

U.S. PATENT DOCUMENTS

| | | | | |
|---|---|---|---|---|
| 5,394,473 | A * | 2/1995 | Davidson | 704/200.1 |
| 6,226,608 | B1 * | 5/2001 | Fielder et al. | 704/229 |
| 7,243,060 | B2 * | 7/2007 | Atlas et al. | 704/200 |

(Continued)

FOREIGN PATENT DOCUMENTS

| | | | |
|---|---|---|---|
| WO | WO 90/14719 | A1 | 11/1990 |
| WO | WO 99/21185 | A1 | 4/1999 |

(Continued)

OTHER PUBLICATIONS

Written Opinion of the International Searching Authority dated Jul. 21, 2011 in connection with International Patent Application No. PCT/CN2010/077794.

(Continued)

*Primary Examiner* — Michael Colucci

(57) ABSTRACT

The present disclosure relates to a signal analyzer for processing an overlapped input signal frame comprising 2N subsequent input signal values. The signal analyzer comprises: a windower adapted to window the overlapped input signal frame to obtain a windowed signal, wherein the windower is adapted to zero M+N/2 subsequent input signal values of the overlapped input signal frame, wherein M is equal or greater than 1 and smaller than N/2; and a transformer adapted to transform the remaining 3N/2−M subsequent windowed signal values of the windowed signal using N−M sets of transform parameters to obtain a transformed-domain signal comprising N−M transformed-domain signal values.

21 Claims, 15 Drawing Sheets

(56) References Cited

U.S. PATENT DOCUMENTS

| | | | | |
|---|---|---|---|---|
| 7,251,322 | B2 * | 7/2007 | Stokes et al. | 379/406.12 |
| 7,386,445 | B2 * | 6/2008 | Ojala | 704/219 |
| 7,899,120 | B2 * | 3/2011 | Cho et al. | 375/240.16 |
| 8,392,202 | B2 * | 3/2013 | Taleb | 704/503 |
| 8,457,975 | B2 * | 6/2013 | Neuendorf et al. | 704/500 |
| 2005/0108003 | A1 * | 5/2005 | Kikuchi et al. | 704/203 |
| 2005/0261892 | A1 * | 11/2005 | Makinen et al. | 704/200.1 |
| 2006/0161427 | A1 * | 7/2006 | Ojala | 704/219 |
| 2006/0173675 | A1 * | 8/2006 | Ojanpera | 704/203 |
| 2007/0094016 | A1 * | 4/2007 | Jasiuk et al. | 704/219 |
| 2010/0076754 | A1 * | 3/2010 | Kovesi et al. | 704/203 |
| 2011/0096854 | A1 * | 4/2011 | Fanson | 375/260 |

FOREIGN PATENT DOCUMENTS

| | | | |
|---|---|---|---|
| WO | WO 99/62189 | A2 | 12/1999 |
| WO | WO 2010/003532 | | 1/2010 |
| WO | WO 2010/003563 | A1 | 1/2010 |
| WO | WO 2010/003618 | A2 | 1/2010 |

OTHER PUBLICATIONS

M. Neuendorf, et al., "Unified Speech and Audio Coding Scheme for High Quality at Low Bitrates", IEEE 2009, p. 1-4.

Jeremie Lecomte, et al., "Efficient cross-fade windows for transitions between LPC-based and non-LPC based audio coding", Audio Engineering Society Convention Paper 7712, May 7-10, 2009, p. 1-9.

John P. Princen, et al., "Analysis/Synthesis Filter Bank Design Based on Time Domain Aliasing Cancellation", IEEE Transaction on Acoustics, Speech, and Signal Processing, vol. ASSP-34, No. 5, Oct. 1986, p. 1153-1161.

International Search Report dated Jul. 21, 2011 in connection with International Patent Application No. PCT/CN2010/077794.

Communication dated Jul. 23, 2013 in connection with European Patent Application No. EP 10 85 8304.

David Virette, et al., "Adaptive Time-Frequency Resolution in Modulated Transform at Reduced Delay", IEEE, Acoustics, Speech and Signal Processing, Mar. 31, 2008, p. 3781-3784.

* cited by examiner

SIGNAL ANALYZER, SIGNAL ANALYZING METHOD, SIGNAL SYNTHESIZER, SIGNAL SYNTHESIZING, WINDOWER, TRANSFORMER AND INVERSE TRANSFORMER

CROSS-REFERENCE TO RELATED APPLICATIONS

This application is a continuation of International Application No. PCT/CN2010/077794, filed on Oct. 15, 2010, entitled "Signal analyzer, signal analyzing method, signal synthesizer, signal synthesizing method, windower, transformer and inverse transformer", which is hereby incorporated by reference.

TECHNICAL FIELD

The present disclosure relates to signal analysis and signal synthesis, and in particular to audio signal processing and coding.

BACKGROUND

Mobile devices are becoming multi-functional devices where various applications are used. In particular, today's cellular phones are also a digital camera, a TV/radio receiver, and a music playback device.

Mixed contents of speech and music are recorded and played on mobile devices. The content is itself streamed or broadcasted to the devices. In mobile applications, highly efficient low-rate coding is in a demand for both speech and music contents.

Current speech and audio codecs performance tend to depend on the types of contents. The state-of-the art speech and audio codecs are tailored and optimized to either speech or music. Speech and audio codecs have in fact evolved independently to each other in terms of target bit rates and corresponding applications. However, recent applications on mobile devices makes the two approaches face the same type of requirements in terms of bit rates and quality.

There have been attempts to standardize codecs that are capable of handling both speech and audio content. One such effort has been conducted in 3GPP with the standardization of AMR-WB+ and E-AAC+. The quality of the resulting codecs, although outperforming specific codecs targeted either at speech or music, still show a tendency to depend on the types of audio contents. That is, music contents are best coded by an audio codec such as EAAC+, and speech contents are best coded by a speech codec such as AMR-WB+.

The MPEG community has also initiated work on unified speech and audio coding (USAC) targeting mainly mobile applications. Such work has resulted in an adoption of a scheme that combines the switching between a time-domain coding paradigm and a frequency domain paradigm as described in Neuendorf, M.; Gournay, P.; Multrus, M.; Lecomte, J.; Bessette, B.; Geiger, R.; Bayer, S.; Fuchs, G.; Hilpert, J.; Rettelbach, N.; Salami, R.; Schuller, G.; Lefebvre, R.; Grill, B. "Unified speech and audio coding scheme for high quality at low bit rates" ICASSP 2009. IEEE International Conference on Acoustics, Speech and Signal Processing, 2009. 19-24 Apr. 2009. Page(s): 1-4.

Using two fundamentally different coding paradigms in one unified system poses a series of problems at the transition points where one core codec switches over to the other: risk of blocking artifacts, possible overhead of information required by transitions and necessity for constant framing. In a framework similar to the Unified Speech and Audio Coder (USAC) as described in Jeremie Lecomte, Philippe Gournay, Ralf Geiger, Bruno Bessette, Max Neuendorf. "Efficient cross-fade windows for transitions between LPC-based and non-LPC based audio coding", Audio Engineering Society Convention Paper, Presented at the 126th Convention 2009 May 7-10 Munich, Germany, all this is particularly challenging because the frequency domain core codec uses a Modified Discrete Cosine Transform (MDCT). The MDCT allows an overlapping of adjacent blocks by a maximum of 50% without introducing additional overhead. This is particularly helpful to smooth blocking artifacts, but requires introducing Time-domain Aliasing (TDA) which may be cancelled out during synthesis as described in J. Princen and A. Bradley, "Analysis/Synthesis Filter Bank Design Based on Time-domain Aliasing Cancellation", IEEE Trans. on Acoustics, Speech and Signal Processing, vol. 34 n. 5, October 1986. A Time-domain Aliasing Cancellation (TDAC) is done by an adequate overlap-add operation of adjacent MDCT blocks on synthesis side.

In USAC however, adjacent blocks can be coded using the Time-domain (TD) coder, which has either Time-domain Aliasing (TDA) in a weighted LPC domain and not in the signal domain or no TDA at all.

In order to allow proper aliasing cancellation with the Frequency Domain (FD) mode (which introduces aliasing in the signal domain), the required aliasing components may be converted into the signal domain (case a) or are introduced artificially by simulating the MDCT operations of analysis windowing, folding, unfolding and synthesis windowing (case b). Another solution to this problem is the design of MDCT analysis/synthesis windows without a TDAC region. The overlap-add operation is then the same as a simple cross-fade over the range of the window slope. Both methods are used in USAC RM0. In order to get the necessary and appropriate overlap areas for cross-fade and TDAC, a slightly different time alignment between the two coding modes had to be introduced.

According to the USAC scheme, a modified start window without any time aliasing on its right side was designed. The right part of this window, which is represented in FIG. 10, finishes before the centre of the TDA (i.e. the folding point) of the MDCT. Consequently, the modified start window is free of time-domain aliasing on its right side. Compared to the standard short window which has an overlap of 128 samples (including TDA), the overlap region of the modified start window is reduced to 64 samples. This overlap region is however still sufficient to smooth the blocking effect. Furthermore, it reduces the impact of the inaccuracy due to the start of the time-domain coder by feeding it with a faded-in input. Note that this transition requires an overhead of 64 samples, i.e. that 64 samples are coded by both the TD codec and the FD codec. This results in a small difference in alignment between the TD and the FD core codecs. This small misalignment is compensated when the codec switches back again to the FD codec, as explained in section 4.4.2. of [2]. Note also that the standard start window with its 128-sample overlap region would have introduced twice as much overhead samples. One of the most important aspects in speech coding, especially in wireless networks is to keep a constant bit rate and a constant framing. This is due to the fact that the radio interfaces have been designed and optimized for legacy speech codecs which have a constant frame length and a constant bit rate. For instance, an important scheduling mode in 3GPP Long Term Evolution (LTE) radio access system is the so-called semi-persistent scheduling, which optimizes radio resources with the assumption that VoIP packets have a constant size and a constant frame rate. Dynamic scheduling is also possible however it comes at an increased cost in terms of radio resources being spent on signalling. Because of these requirements of constant bit rate and constant frame rate, schemes such as USAC are impractical since switching back and forth between TD and FD coding modes would lead to de-synchronization.

Similar problems may in general also occur when switching between two different signal processing modes or codecs, and may also occur in other signal processing areas, e.g. image or video processing or coding.

SUMMARY

It is the object of the present disclosure to provide a concept for signal processing (analysis and synthesis or encoding and decoding), which enables efficiently switching between two different processing modes, and in particular efficiently switching between time-domain and frequency domain processing or coding of digital signals, in particular digital audio signals.

This object is achieved by the features of the independent claims. Further embodiments are apparent from the dependent claims.

The present disclosure is based on the finding that an efficient concept for switching between time-domain processing and frequency domain processing of e.g. audio signals may be provided when shortening a window which is used for windowing the audio signal during a transition from e.g. time-domain processing to frequency domain processing or vice versa. Thus, according to some implementations, a minimum switching delay may be provided while keeping synchronization between the time-domain and frequency-domain processing modes. Furthermore, due to the shortened window, a shortened transform for transforming the digital audio signal into frequency domain may be applied. As the transform may be based on cosine functions which are similar to those used by the conventional MDCT approach, the domain into which the digital audio signal is transformed may differ from the frequency domain which is provided, for example, by the MDCT or a Fourier transformer. Therefore, in the following, the broader term "transformed-domain" is used to denote the domain into which a signal is transformed using oscillations at different frequencies.

According to a first aspect, the present disclosure relates to a windower for windowing or weighting an overlapped input signal frame comprising 2N subsequent input signal values to obtain a windowed signal, the windower being configured to zero M+N/2 subsequent input signal values of the overlapped input signal frame, M being equal or greater than 1 and smaller than N/2.

The windower according to the first aspect can be implemented together with a transformer according to the second aspect, an inverse transformer according to the third aspect or with other suitable transformations, for example MDCT transformations, while still enabling low delay or faster switching, constant bit rates and synchronization in case of transitions between transform-domain processing and signal-domain signal processing modes, and in particular between frequency-domain and time-domain processing modes.

According to a first implementation form of the first aspect, the overlapped input signal frame is formed by two subsequent input signal frames, namely a previous input signal frame and a subsequent current or actual input signal frame, wherein the current and the previous input signal frame each comprise N subsequent input signal values, and wherein within the overlapped input signal frame a last input signal value of the previous input signal frame directly precedes a first input signal value of the current input signal frame.

According to a second implementation form of the first aspect, which may additionally comprise the features of the first implementation form of the first aspect, a window applied to the overlapped input signal frame by the windower has N/2+M coefficients equal to zero, or, the windower is adapted to truncate the M+N/2 subsequent input signal values.

According to a third implementation form of the first aspect, which may additionally comprise the features of the first and/or second implementation form of the first aspect, the windower is configured to weight the remaining 3N/2−M subsequent input signal values of the overlapped input signal frame using 3N/2−M coefficients, wherein the 3N/2−M coefficients comprise at least N/2 subsequent nonzero coefficients.

According to a fourth implementation form of the first aspect, which may additionally comprise the features of any of the first to third implementation form of the first aspect, the window applied to the overlapped input signal frame by the windower has a raising slope and a falling slope, the falling slope having less coefficients than the raising slope, or the raising slope having less coefficients than the falling slope.

According to a fifth implementation form of the first aspect, which may additionally comprise the features of any of the first to fourth implementation form of the first aspect, the window applied to the overlapped input signal frame by the windower has a rising slope and a falling slope, the falling slope having less coefficients than the raising slope, and/or the rising slope having less coefficients than the falling slope, wherein the windower is adapted to apply in response to a transition indicator to the overlapped input signal frame either the window comprising the falling slope having less coefficients than the raising slope or the window comprising the raising slope having less coefficients than the falling slope.

According to a sixth implementation form of the first aspect, which may additionally comprise the features of any of the first to fifth implementation form of the first aspect, the window applied to the overlapped input signal frame by the windower has N/2−M coefficients forming a falling slope and N coefficients forming a rising slope, in particular forming a continuously rising slope.

According to a seventh implementation form of the first aspect, which may additionally comprise the features of any of the first to fifth implementation form of the first aspect, the window applied to the overlapped input signal frame by the windower has N/2−M coefficients forming a rising slope and N coefficients forming a falling slope, in particular forming a continuously falling slope.

According to a eighth implementation form of the first aspect, which may additionally comprise the features of any of the first to seventh implementation form of the first aspect, the window applied to the overlapped input signal frame by the windower has N/2−M coefficients forming a falling slope, and N coefficients forming a raising slope, or has N/2−M coefficients forming a raising slope, and N coefficients forming a falling slope, wherein the windower is adapted to apply in response to a transition indicator to the overlapped input signal frame either the window comprising the N/2−M coefficients forming the falling slope or the window comprising the N/2−M coefficients forming the raising slope.

According to a ninth implementation form of the first aspect, which may additionally comprise the features of any of the first to eighth implementation form of the first aspect, the overlapped input signal frame is formed by two subsequent input signal frames, each having N input signal values, wherein the windower is configured to output not more than 3N/2−M successively windowed input signal values beginning with a current input signal frame of the two input signal frames, in particular beginning with a first input signal value of the current frame.

According to a tenth implementation form of the first aspect, which may additionally comprise the features of any of the first to ninth implementation form of the first aspect, the input signal is a time-domain signal and the transform-domain signal is a frequency-domain signal.

According to an eleventh implementation faun of the first aspect, which may additionally comprise the features of any of the first to tenth implementation form of the first aspect, the input signal is an audio time-domain signal and the transform-domain signal is a frequency-domain signal.

According to a second aspect, the present disclosure relates to a transformer for transforming an overlapped input signal frame into a transformed-domain signal, the overlapped input signal frame having 2N input signal values, the transformer being configured to transform 3N/2−M signal values of the overlapped input signal frame using N−M sets of transform parameters to obtain the transformed-domain signal. The overlapped input signal frame may be a time-domain signal and the transformed-domain signal may be a frequency-domain signal. According to some implementations, the input of the transformer may be the output of the windower.

According to a first implementation form of the second aspect, the sets of transform parameters are arranged to form a parameter matrix with N−M rows and 3N/2−M columns.

According to a second implementation form of the second aspect, which may additionally comprise the features of the first implementation form of the second aspect, the transformer is configured to output N−M transformed-domain signal values.

According to a third implementation form of the second aspect, which may additionally comprise the features of the first or second implementation form of the second aspect, each set of transform parameters represents an oscillation at a certain frequency, wherein a spacing, in particular a frequency spacing, between two oscillations is dependent on N−M.

According to a fourth implementation form of the second aspect, which may additionally comprise the features of any of the first to third implementation forms of the second aspect, the sets of transform parameters comprise a discrete cosine modulation matrix, in particular a type IV discrete cosine modulation square matrix, of size N−M.

According to a fifth implementation form of the second aspect, which may additionally comprise the features of any of the first to fourth implementation forms of the second aspect, the overlapped input signal frame is a time-domain signal and the sets of transform parameters comprise a time-domain aliasing operation.

According to a sixth implementation form of the second aspect, which may additionally comprise the features of any of the first to fifth implementation forms of the second aspect, the transformer comprises the inventive windower. In other words, the transformer performs the windowing and the transforming in a single processing step.

According to a seventh implementation form of the second aspect, which may additionally comprise the features of any of the first to sixth implementation forms of the second aspect, the transformer is configured to transform the overlapped input signal frame in time-domain into a transformed-domain signal in a transformed domain, e.g. in frequency domain.

According to an eighth implementation form of the second aspect, which may additionally comprise the features of any of the first to seventh implementation forms of the second aspect, the sets of transform parameters may be determined by the following formula:

$$d_{kn} = \cos\left(\frac{\pi}{N-M}\left(k+\frac{1}{2}\right)\left(n+\frac{N+1}{2}-M\right)\right),$$

$$k = 0, \ldots, N-M-1, n = 0, \ldots, \frac{3N}{2}-1-M$$

wherein k is a set index and defines one of the N−M sets of transform parameters, n defines one of the transform parameters of a respective set of transform parameters, and $d_{kn}$ denotes the transform parameter specified by n and k.

According to a third aspect, the present disclosure relates to an inverse transformer for inversely transforming a transformed-domain signal, the transformed-domain signal having N−M transformed-domain signal values, the inverse transformer being configured to inversely transform the N−M transformed-domain signal values into 3N/2−M inversely transformed-domain signal values using 3N/2−M sets of inverse transform parameters. The inversely transformed-domain signal values may be associated with an inverse transformed-domain or signal-domain, e.g. with a time domain.

According to a first implementation form of the third aspect, the sets of inverse transform parameters are arranged to form a parameter matrix with 3N/2−M rows and N−M columns.

According to a second implementation form of the third aspect, which may additionally comprise the features of the first implementation form of the third aspect, the inverse transformer is configured to output 3N/2−M inversely transformed-domain signal values, in particular time-domain signal values.

According to a third implementation form of the third aspect, which may additionally comprise the features of the first or second implementation form of the third aspect, each set of transform parameters represents an oscillation at a certain frequency, wherein a spacing between two oscillations is dependent on N−M.

According to a fourth implementation form of the third aspect, which may additionally comprise the features of any of the first to third implementation forms of the third aspect, the sets of inverse transform parameters comprise a discrete cosine modulation matrix, in particular a type IV discrete cosine modulation square matrix, of size N−M.

According to a fifth implementation form of the third aspect, which may additionally comprise the features of any of the first to third implementation forms of the fourth aspect, the sets of inverse transform parameters comprise an inverse time-domain aliasing operation.

According to a sixth implementation form of the third aspect, which may additionally comprise the features of any of the first to fifth implementation forms of the third aspect, the inverse transformer comprises the inventive windower. In other words, the inverse transformer performs the inverse transforming and the windowing in a single processing step.

According to an seventh implementation form of the third aspect, which may additionally comprise the features of any of the first to sixth implementation forms of the third aspect, the sets of inverse transform parameters are determined by the following formula:

$$g_{kn}=\cos\left(\frac{\pi}{N-M}\left(k+\frac{1}{2}\right)\left(n+\frac{N+1}{2}-M\right)\right),$$
$$n=0,\ldots,\frac{3N}{2}-1-M,k=0,\ldots,N-M-1$$

wherein n is a set index and defines one of the 3N/2−M sets of inverse transformation parameters, k defines one of the transformation parameters of a respective set of transformation parameters, and $g_{kn}$, denotes the transformation parameter specified by n and k.

According to a fourth aspect, the present disclosure relates to an audio signal analyzer for processing an overlapped input signal frame, the audio signal analyzer comprising the windower according to the first aspect or any of the implementation forms of the first aspect and/or the inventive transformer according to the second aspect or any of the implementation forms of the second aspect.

According to a first implementation form of the fourth aspect, the windower is configured to window the input signal to obtain a windowed input signal, and the transformer is configured to transform the windowed input signal into a transformed-domain signal in a transformed-domain, e.g. in a frequency domain.

According to a second implementation form of the fourth aspect, which may additionally comprise the features of the first implementation form of the fourth aspect, the windower is configured to window the input signal using N/2−M coefficients forming a raising slope and N coefficients forming a falling slope.

According to a third implementation form of the fourth aspect, which may additionally comprise the features of the first or second implementation form of the fourth aspect, the windower is configured to window the input signal using N/2−M coefficients forming a falling slope and N coefficients forming a raising slope.

According to a fourth implementation form of the fourth aspect, which may additionally comprise the features of any of the first to third implementation forms of the fourth aspect, the audio signal analyzer has a time-domain processing mode and a transformed-domain processing mode, wherein the windower is configured to, when switching from the transformed-domain processing mode to the time domain processing mode in response to a transition indicator, window the overlapped input signal frame using a window having N coefficients forming a rising slope, and N/2−M coefficients forming a falling slope as part of the transformed-domain processing mode; and/or wherein the windower is configured to, when switching from the time domain processing mode to the transformed-domain processing mode in response to a transition indicator, window the overlapped input signal frame using a window having N/2−M coefficients forming a rising slope and N coefficients forming a falling slope as part of the transformed-domain processing mode.

According to a fifth implementation form of the fourth aspect, which may additionally comprise the features of any of the first or third to fourth implementation forms of the fourth aspect, the overlapped input signal frame is formed by a current input signal frame and a previous input signal frame, each having N subsequent input signal values, and the audio signal analyzer has a time-domain processing mode and a transformed-domain processing mode, wherein the audio signal analyzer is further configured to when switching from the transformed-domain processing mode to the time domain processing mode in response to a transition indicator, process at least a portion of the current input signal frame according to a time-domain processing mode; and/or when switching from the time domain processing mode to the transformed-domain processing mode in response to a transition indicator, process at least a portion of the previous input signal frame according to a time-domain processing mode.

According to a sixth implementation form of the fourth aspect, which may additionally comprise the features of any of the first to fifth implementation forms of the fourth aspect, the audio analyzer further comprises a processing mode transition detector adapted to trigger a transition from the time-domain processing mode to the transformed-domain processing mode, or to trigger a transition from the transformed-domain processing mode to the time-domain processing mode. The control for triggering a transition from time-domain processing mode to frequency-domain processing mode or transition from frequency-domain processing mode to time-domain processing mode is, by way of example, dependent on which processing mode is most suitable for the input signal frame. The processing mode transition detector can be, for example, a coding mode transition detector.

According to a seventh implementation form of the fourth aspect, which may additionally comprise the features of any of the first to sixth implementation forms of the fourth aspect, the audio analyzer is further configured during a transition from a transform-domain processing mode to a time-domain processing mode or from a time-domain processing mode to a transform-domain processing mode to window and transform an overlapped input signal frame according to one of the above implementation forms as part of the transformed-domain processing mode to obtain an transformed-domain signal, wherein the overlapped input signal frame is formed by a current input signal frame and the previous input signal frame, and to additionally process the current input signal frame at least partially according to the time-domain processing mode.

According to a fifth aspect, the present disclosure relates to an audio synthesizer for synthesizing a transformed-domain signal, the audio synthesizer comprising the inverse transformer according to the third aspect or any implementation form of the third aspect, or the windower according to the first aspect or any implementation form of the first aspect.

According to a first implementation form of the fifth aspect, the inverse transformer is configured to inversely transform the transformed-domain signal into an inverse transformed-domain signal, for example into a time-domain signal, and wherein the windower is configured to window the inverse transformed-domain signal to obtain a windowed signal. An overlap-add approach may be deployed with respect to the windowed signal to synthesize an output signal in the time-domain.

According to a second implementation form of the fifth aspect, which may additionally comprise the features of the first implementation form of the fifth aspect, the windower is configured for windowing using N/2−M coefficients which form a falling slope, and N coefficients forming a raising slope, or for windowing using N/2−M coefficients which form a raising slope, and N coefficients forming a falling slope.

According to a third implementation form of the fifth aspect, which may additionally comprise the features of any of the first or second implementation form of the fifth aspect, the audio synthesizer has a time-domain processing mode for time-domain processing, or a transformed-domain processing mode for transformed-domain processing, wherein the windower is configured to window the inverse transformed-domain signal for transition from the transformed-domain processing mode to the time-domain processing mode.

According to a fourth implementation form of the fifth aspect, which may additionally comprise the features of any of the first to third implementation forms of the fifth aspect, the audio synthesizer has a time-domain processing mode for time-domain processing, or a transformed-domain processing mode for transformed-domain processing, wherein the windower is configured to window the inverse transformed-domain signal for the transition from the time-domain processing mode to the transformed-domain processing mode.

According to a fifth implementation form of the fifth aspect, which may additionally comprise the features of any of the first to fourth implementation forms of the fifth aspect, the audio synthesizer further comprises a transition detector adapted to trigger a transition of the signal synthesizer from the time-domain processing mode to the transformed-domain processing mode.

According to a sixth implementation form of the fifth aspect, which may additionally comprise the features of any of the first to fifth implementation forms of the fifth aspect, the audio synthesizer further comprises a transition detector adapted to trigger a transition of the audio synthesizer from the transformed-domain processing mode to the time-domain processing mode.

According to a sixth aspect, the present disclosure relates to a signal analyzer for processing an overlapped input signal frame comprising 2N subsequent input signal values, wherein the signal analyzer comprises: a windower adapted to window the overlapped input signal frame to obtain a windowed signal, the windower being adapted to zero M+N/2 subsequent input signal values of the overlapped input signal frame, wherein M is equal or greater than 1 and smaller than N/2; and a transformer adapted to transform the remaining 3N/2−M subsequent windowed signal values of the windowed signal using N−M sets of transform parameters to obtain a transformed-domain signal comprising N−M transformed-domain signal values.

According to a first implementation form of the sixth aspect, the window applied to the overlapped input signal frame by the windower comprises M+N/2 subsequent coefficients equal to zero, or, wherein the windower is adapted to truncate the M+N/2 subsequent input signal values.

According to a second implementation form of the sixth aspect, which may additionally comprise the features of the first implementation form of the sixth aspect, the overlapped input signal frame is formed by two subsequent input signal frames each having N subsequent input signal values.

According to a third implementation form of the sixth aspect, which may additionally comprise the features of the first or second implementation form of the sixth aspect, each of the N−M sets of transform parameters represents an oscillation at a certain frequency, and wherein a spacing, in particular a frequency spacing, between two oscillations is dependent on N−M According to a fourth implementation form of the sixth aspect, which may additionally comprise any of the features of the first to third implementation form of the sixth aspect, the sets of transform parameters comprise a time-domain aliasing operation (405).

According to a fifth implementation form of the sixth aspect, which may additionally comprise any of the features of the first to fourth implementation form of the sixth aspect, the sets of transform parameters are determined by the following formula:

$$d_{kn} = \cos\left(\frac{\pi}{N-M}\left(k+\frac{1}{2}\right)\left(n+\frac{N+1}{2}-M\right)\right),$$

$$k = 0, \ldots, N-M-1, n = 0, \ldots, \frac{3N}{2}-1-M,$$

wherein k is a set index and defines one of the N−M sets of transform parameters, n defines one of the transform parameters of a respective set of transform parameters, and $d_{kn}$ denotes the transform parameter specified by n and k.

According to a sixth implementation form of the sixth aspect, which may additionally comprise any of the features of the first to fifth implementation form of the sixth aspect, the signal analyzer has a time-domain processing mode and a transformed-domain processing mode, wherein the windower is configured to, when switching from the transformed-domain processing mode to the time domain processing mode in response to a transition indicator, window the overlapped input signal frame using a window having N coefficients forming a rising slope, and N/2−M coefficients forming a falling slope as part of the transformed-domain processing mode; and/or wherein the windower is configured to, when switching from the time domain processing mode to the transformed-domain processing mode in response to a transition indicator, window the overlapped input signal frame using a window having N/2−M coefficients forming a rising slope and N coefficients forming a falling slope as part of the transformed-domain processing mode.

According to a seventh implementation form of the sixth aspect, which may additionally comprise any of the features of the first to sixth implementation form of the sixth aspect, the overlapped input signal frame is formed by a current input signal frame and a previous input signal frame, each having N subsequent input signal values, wherein the signal analyzer has a time-domain processing mode and a transformed-domain processing mode, and wherein the signal analyzer is further configured to when switching from the transformed-domain processing mode to the time domain processing mode in response to a transition indicator, process at least a portion of the current input signal frame according to a time-domain processing mode; and/or when switching from the time domain processing mode to the transformed-domain processing mode in response to a transition indicator, process at least a portion of the previous input signal frame according to a time-domain processing mode.

According to an eighth implementation form of the sixth aspect, which may additionally comprise any of the features of the first to seventh implementation form of the sixth aspect, the signal analyzer is an audio signal analyzer (401) and the input signal is an audio input signal in the time-domain.

According to a seventh aspect, the present disclosure relates to a signal synthesizer for processing an transformed-domain signal comprising N−M transformed-domain signal values, wherein M is greater than 1 and smaller than N/2, and wherein the signal synthesizer comprises: an inverse transformer adapted to inversely transform the N−M transformed-domain signal values using 3N/2−M sets of inverse transform parameters to obtain 3N/2−M inverse transformed-domain signal values; and a windower adapted to window the 3N/2−M inverse transformed-domain signal values using a window comprising 3N/2−M coefficients to obtain a windowed signal comprising 3N/2−M windowed signal values, wherein the 3N/2−M coefficients comprise at least N/2 subsequent nonzero window coefficients.

According to a first implementation form of the sixth aspect, each of the 3N/2−M sets of inverse transform parameters represents an oscillation at a certain frequency, and wherein a spacing, in particular a frequency spacing, between two oscillations is dependent on N−M.

According to a second implementation form of the sixth aspect, which may additionally comprise any of the features of the first implementation form of the seventh aspect, the sets of inverse transform parameters comprise an inverse time-domain aliasing operation.

According to a third implementation form of the sixth aspect, which may additionally comprise any of the features of the first or second implementation form of the seventh aspect, the sets of inverse transform parameters are determined by the following formula:

$$g_{kn} = \cos\left(\frac{\pi}{N-M}\left(k+\frac{1}{2}\right)\left(n+\frac{N+1}{2}-M\right)\right),$$

$$n = 0, \ldots, \frac{3N}{2}-1-M, k = 0, \ldots, N-M-1$$

wherein n is a set index and defines one of the 3N/2−M sets of inverse transform parameters, k defines one of the inverse transform parameters of a respective set of inverse transform parameters, and $g_{kn}$ denotes the inverse transform parameter specified by n and k.

According to a fourth implementation form of the sixth aspect, which may additionally comprise any of the features of the first to third implementation form of the seventh aspect, the signal synthesizer further comprises: an overlap-adder adapted to overlap and add the windowed signal and another windowed signal to obtain an output signal comprising at least N output signal values.

According to a fifth implementation form of the sixth aspect, which may additionally comprise any of the features of the first to fourth implementation form of the seventh aspect, the signal synthesizer has a time-domain processing mode and a transformed-domain processing mode, wherein the windower is configured to, when switching from the transformed-domain processing mode to the time domain processing mode in response to a transition indicator, window the inverse transformed domain signal using a window having N subsequent coefficients forming a rising slope, and N/2−M coefficients forming a falling slope; and/or wherein the windower is configured to, when switching from the time domain processing mode to the transformed-domain processing mode in response to a transition indicator, window the inverse transformed-domain signal using a window having N/2−M coefficients forming a rising slope, and N coefficients forming a falling slope.

According to a sixth implementation form of the sixth aspect, which may additionally comprise any of the features of the first to fifth implementation form of the seventh aspect, the signal synthesizer is an audio signal synthesizer, wherein the transformed-domain signal is a frequency domain signal and the inverse-transformed domain signal is a time-domain audio signal.

According to an eighth aspect, the present disclosure relates to an audio encoder comprising the inventive windower (according to the first aspect or any of its implementation forms) and/or the inventive transformer (according to the second aspect or any of its implementation forms) and/or an audio analyzer (according to the fourth or sixth aspect or any of their implementation forms).

According to a ninth aspect, the present disclosure relates to an audio decoder, comprising the inventive windower (according to the first aspect or any of its implementation forms) and/or the inverse transformer (according to the third aspect or any of its implementation forms) and/or an audio synthesizer (according to the fifth or seventh aspect or any of their implementation forms).

According to an tenth aspect, the present disclosure relates to a method for windowing an overlapped input signal frame comprising 2N subsequent input signal values, the windowing comprising zeroing N/2+M subsequent input signal values of the overlapped input signal frame, M being equal or greater than 1 and smaller than N/2.

According to a eleventh aspect, the present disclosure relates to a method for transforming an overlapped input signal frame, the method comprising transforming 3N/2−M subsequent input signal values of the overlapped input signal frame using N−M sets of transform parameters to obtain a transformed-domain signal comprising N−M transformed-domain signal values.

According to a twelfth aspect, the present disclosure relates to a method for inversely transforming a transformed-domain signal, the transformed-domain signal having N−M values, the method comprising inverse transforming the N−M transformed-domain signal values into 3N/2−M inversely transformed signal values using 3N/2−M sets of inverse transform parameters.

According to a thirteenth aspect, the present disclosure relates to a method for processing an input signal, the method comprising windowing the input signal or transforming the input signal according to the principles described herein.

According to a fourteenth aspect, the present disclosure relates to a synthesizing method comprising inversely transforming a transformed-domain signal into an output signal according to the principles described herein.

According to a fifteenth aspect, the present disclosure relates to an audio encoding method, comprising the inventive method for windowing and/or the inventive method for transforming and/or the method for processing according to the principles described herein.

According to a fourteenth aspect, the present disclosure relates to an audio decoding method comprising the inventive method for windowing and/or the inventive method for inversely transforming and/or the inventive synthesizing method.

According to a fifteenth aspect, the present disclosure relates to a signal analyzing method for processing an overlapped input signal frame comprising 2N subsequent input signal values, wherein the signal analyzing method comprises the following steps: windowing the overlapped input signal frame to obtain a windowed signal, the windowing comprising zeroing M+N/2 subsequent input signal values of the overlapped input signal frame, wherein M is equal or greater than 1 and smaller than N/2; and transforming the remaining 3N/2−M subsequent windowed signal values of the windowed signal using N−M sets of transform parameters to obtain a transformed domain signal comprising N−M transformed-domain signal values.

According to a sixteenth aspect, the present disclosure relates to a signal synthesizing method for processing a transformed-domain signal comprising N−M transformed-domain signal values, wherein M is equal or greater than 1 and smaller than 3N/2, and wherein the signal synthesizing method comprises the following steps: inversely transforming the N−M transformed-domain signal values using 3N/2−M sets of inverse transform parameters to obtain 3N/2−M inverse transformed-domain signal values; and windowing the 3N/2−M inverse transformed-domain signal values using a window comprising 3N/2−M coefficients to obtain a windowed signal comprising 3N/2−M windowed signal values, wherein the 3N/2−M coefficients comprise at least N/2 subsequent nonzero window coefficients According to a further first implementation form of any the aforementioned aspects or any of their implementation forms, the overlapped input signal frame is formed by two subsequent input signal frames, namely a previous input signal frame and a subsequent current signal frame, wherein the current and the previous input signal frame each comprise N subsequent input signal values, and wherein within the overlapped input signal frame a last input signal value of the previous input signal frame directly precedes a first input signal value of the current input signal frame.

According to a further implementation form of any the aforementioned aspects or any of their implementation forms, N is an integer number and greater than 1 and M is an integer number. Typical values of N are, for example, 256 samples, 512 samples or 1024 samples. However, implementation forms of the present disclosure are not limited to these values of N.

Although the aspects and implementation forms are primarily described for audio signal processing or coding, the aforementioned aspects and implementation forms may equally be used to process or code other (non-audio) time-domain signals or other signals, i.e. other than time-domain signals, e.g. spatial domain signals.

Therefore, according to a further implementation form of any of the aforementioned aspects or any of their implementation forms, the input signal, in particular the overlapped input signal frame and the input signal frames, of the transition detector, windower, transformer, audio analyzer, signal analyzer, encoder, etc, and of the corresponding methods is a time-domain signal, the transformed-domain signal is a frequency-domain signal, and the inverse-transformed domain signal of the corresponding inverse transformer, windower, audio synthesizer, signal synthesizer, decoder, etc. is again a time-domain signal.

Therefore, according to an even further implementation form of any of the aforementioned aspects or of their implementation forms which do not relate to time-domain signal processing, the input signal, in particular the overlapped input signal frame and the input signal frames, of the transient detector, windower, transformer, signal analyzer, etc. and of the corresponding methods is a spatial-domain signal, the transformed-domain signal is a spatial frequency-domain signal, and the inverse-transformed domain signal of the corresponding inverse transformer, windower, signal synthesizer etc. is again a spatial-domain signal.

The respective means, in particular the transition detector, the windower, the transformer, the inverse transformer, the overlap-adder, the processor, the audio analyzer, the signal analyzer, the audio synthesizer, the signal synthesizer, the encoder and the decoder are functional entities and can be implemented in hardware, in software or as combination of both, as is known to a person skilled in the art. If said means are implemented in hardware, it may be embodied as a device, e.g. as a computer or as a processor or as a part of a system, e.g. a computer system. If said means are implemented in software it may be embodied as a computer program product, as a function, as a routine, as a program code or as an executable object.

BRIEF DESCRIPTION OF THE DRAWINGS

Further embodiments of the present disclosure will be described with respect to the following figures, in which.

DETAILED DESCRIPTION

Figure 1:
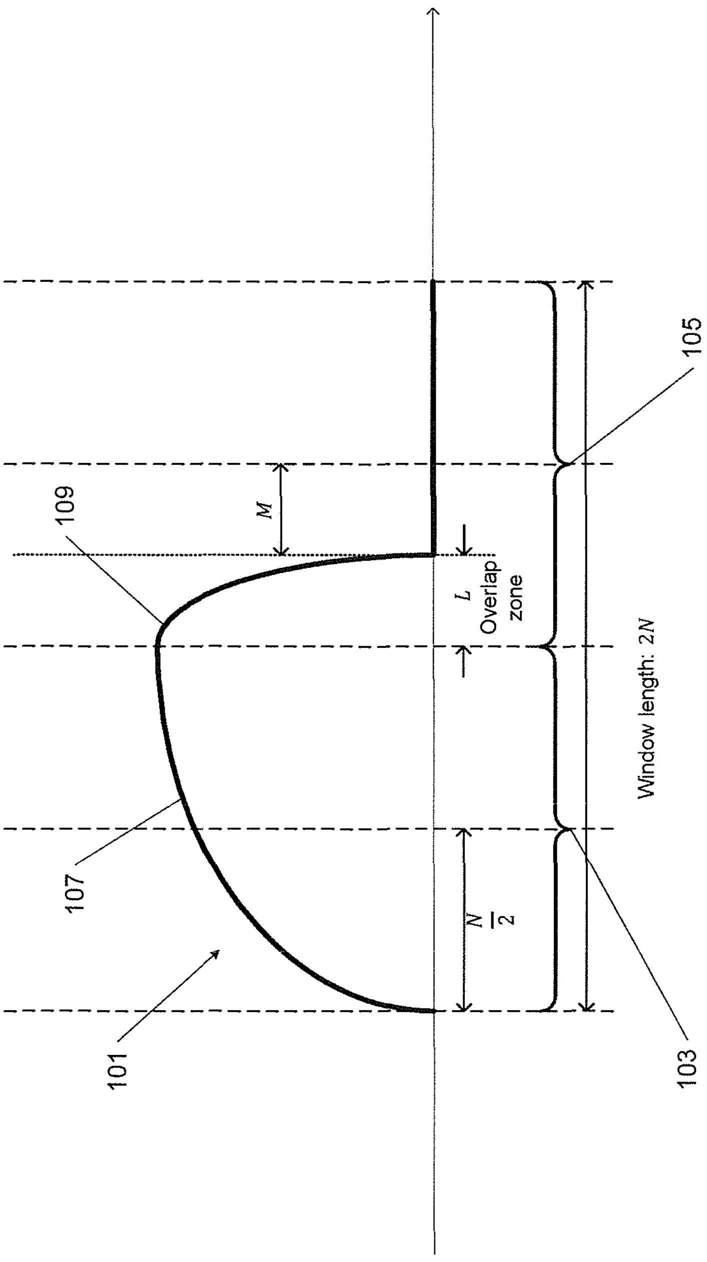
FIG. 1 shows a window of a windower according to an implementation form.

FIG. 1 shows a window 101 of a windower according to an implementation form. The window is configured to window or weight an input signal forming an input signal block having 2N signal values. The input signal is composed of two consecutive input signal frames 103 and 105 (first input signal frame 103 and second input signal frame 105). The first input signal frame 103 is, for example, a previous input signal frame 103, which is previous to or which precedes the second or current input signal frame 105. The combined input signal formed by the previous input signal frame 103 and the current input signal frame may also be referred to as overlapped input signal frame. Each input signal frame 103, 105 comprises N consecutive input signal values and is subdivided into two subframes. Thus, each subframe has N/2 values and the overlapped input signal frame has 2N samples. As shown in FIG. 1, the window has 3N/2−M non-zero coefficients, wherein M denotes the number of zeros in the $3^{rd}$ subframe with regard to the window, which is applied to the overlapped input signal frame, and correspondingly also denotes the number of zeros of the portion of the window, which is applied to the first subframe of the second or current frame 105, M is greater or equal to 1 and smaller than N/2. Thus, the window is zeroing M+N/2 values of the input signal or overlapped input signal frame, and in particular of the second or current input signal frame 105.

The window has a rising slope 107 having N coefficients, and a falling slope 109 having L coefficients, where L is equal to N/2−M, the number of non-zero coefficients in the $3^{rd}$ subframe. The falling slope 109 forms an overlap zone of length L.

The window shown in FIG. 1 may be used for transition from a transformed domain processing, e.g. frequency domain processing, to a time domain processing. In this case, for example, the last M+N/2 values of the second input signal frame 105 are zeroed or truncated (see FIG. 1), wherein truncating refers to cutting off these M+N/2 values such that the windowed signal only comprises 3N/2−M windowed signal values. For transition from a time-domain to a transformed domain, a mirrored shape of the window shown in FIG. 1 may be deployed (235), wherein the window shape or function is mirrored at the center (vertical broken line in the center of the window function of FIG. 1) of the window or window function of length 2N, or in other words, at the border between the first input signal frame 103 and the second input signal frame 105. Thus, in this mirrored case, for example, the first M+N/2 values of the first input signal frame 105 are zeroed or truncated, wherein truncating again refers to cutting off these M+N/2 values such that the windowed signal only comprises 3N/2−M windowed signal values.

Figure 2A:
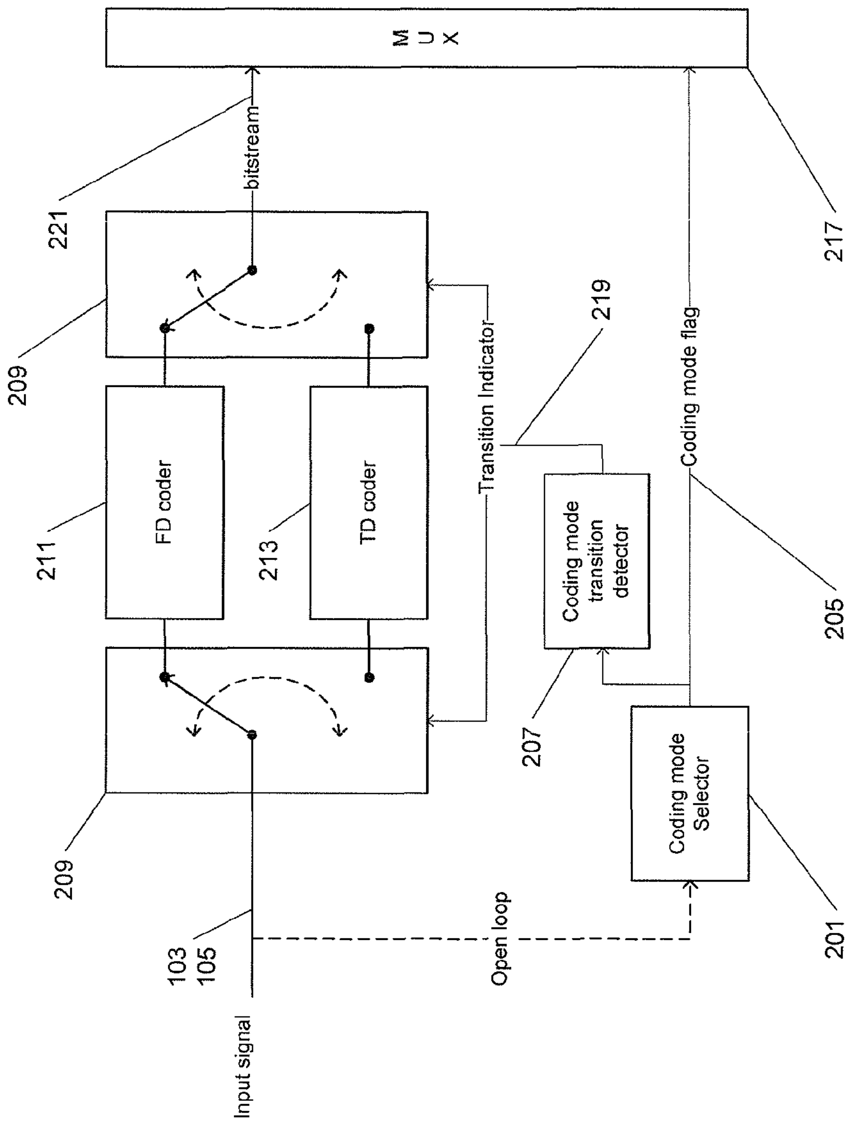
FIG. 2A shows a block-diagram of an embodiment of an encoder with open-loop processing mode selection.

FIG. 2A shows an embodiment of an encoder according to the present disclosure. The encoder comprises a coding mode selector 201, an FD coder 211 for FD coding mode and a TD coder 213 for TD coding mode. For each input signal frame 103, 105 of length N, the coding mode selector outputs a coding-mode flag 205 which determines the appropriate coding mode, chosen from TD or FD coding modes, for the current input signal frame. The coding mode selector may be operated in closed loop or in open loop. In open-loop mode, the coding mode selector decides on which coding mode based on the input signal characteristics, which may include parameters such as input-signal frame power, spectral tilt, tonality, etc. In contrast to open-loop mode, closed-loop mode is based on the result of the potential decisions. As such the coding mode selector may trigger to perform a first encoding of the input signal frame by the FD coder 211 according to the FD coding mode and a second encoding of the input signal frame by the TD coder 213 according to the TD coding mode, determine and compare a fidelity criterion obtained for each of the TD coding mode and the FD coding mode, and select the most appropriate coding mode of the TD and FD coding modes for the current input signal frame based on the comparison of the results, respectively the determined fidelity criteria, of the first encoding and the second encoding. There are numerous fidelity criteria that may be used, for instance, signal-to-noise ratio (SNR), segmental SNR (segSNR), weighted SNR (wSNR), weighted segSNR (wsegSNR), etc. In both open-loop and closed-loop approaches, the coding mode selector's decision may be represented by a binary flag 205 which indicates which of the coding modes is chosen for the current input signal frame, e.g. input signal frame 103. According to the present disclosure, if a transition between time domain coding and frequency domain coding is detected by a coding mode transition detector 207, a transition indicator 219 triggers a switching, symbolically represented by switches 209, between the different coding modes. Hence, if a TD to FD or a FD to TD switching is detected, a switching procedure between the two coding modes is initiated and the appropriate coder is then used. The resulting bit-stream 221 corresponding to either the TD coder or the frequency domain coder may be multiplexed by a multiplexer 217 together with the coding mode flag 205 and transmitted to a decoder or some other destination, for example a storage medium. The coding mode transition detector 207 can, for example, be adapted to store the coding mode flag of the previous input signal frame 103 and to compare the coding mode flag of the current input signal frame 105 with the stored coding mode flag of the previous input signal frame 103. In case the coding mode flags of the current input signal frame 105 and the previous input signal frame 103 are the same, the same coding mode is maintained and no transition to a different coding mode is detected by the coding mode transition detector 207, whereas in case the coding mode flags of the current input signal frame 105 and the previous input signal frame 103 are not the same, a transition to a different coding mode is detected. The coding mode transition detector 207 can be further adapted to, in case the coding mode flag of the current input signal frame 105 indicates a TD coding mode and the coding mode flag of the previous input signal frame 103 indicates an FD coding mode, detect and trigger by an appropriate transition indicator 219 a transition from the FD coding mode to the TD coding mode, and vice versa, i.e. in case the coding mode flag of the current input signal frame 105 indicates an FD coding mode and the coding mode flag of the previous input signal frame 103 indicates a TD coding mode, detect and trigger by an appropriate transition indicator 219 a transition from the TD coding mode to the FD coding mode.

Figure 2B:
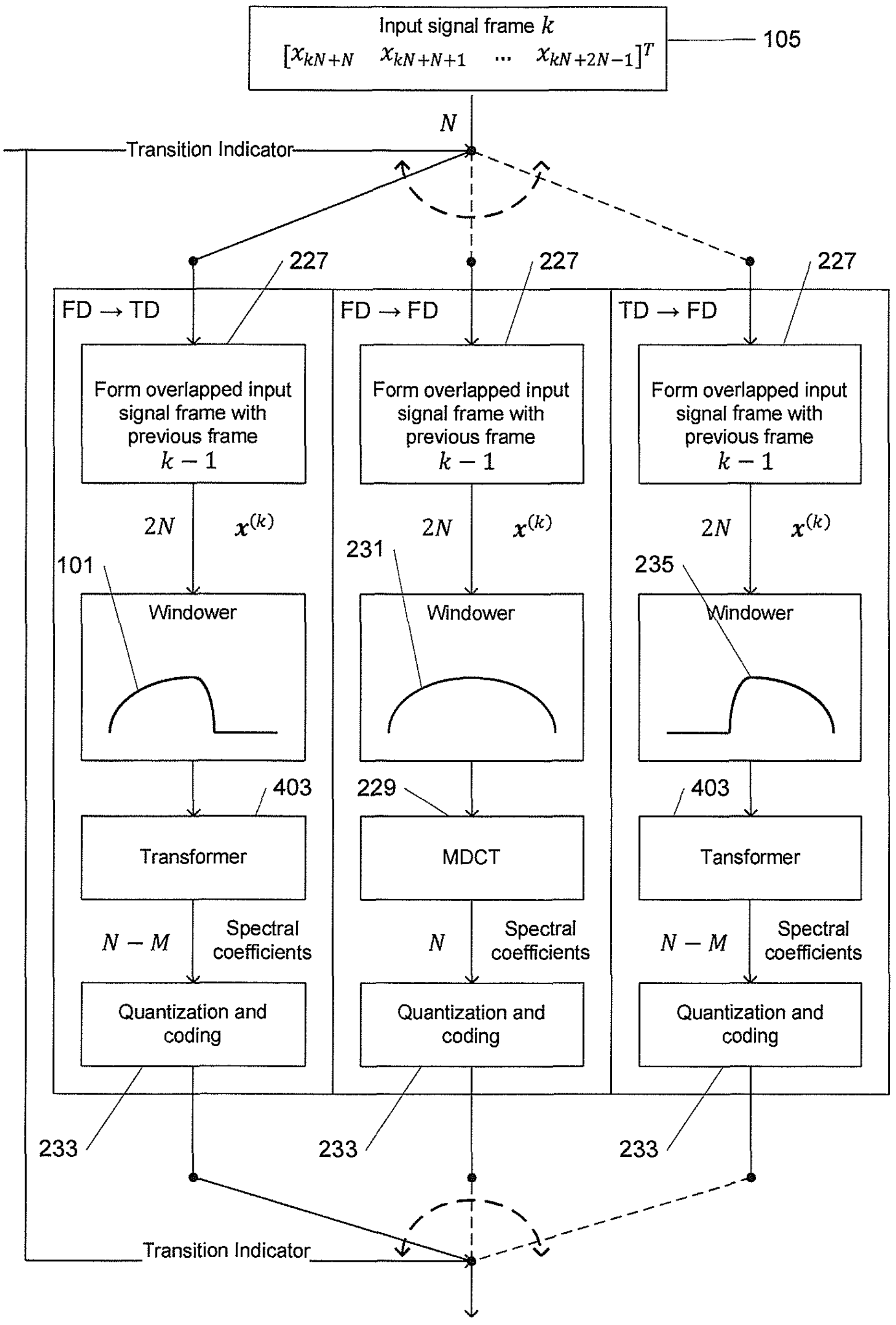
FIG. 2B shows a block-diagram of an embodiment of a transform-domain processing block, which may be used in the encoder of FIG. 2A.

FIG. 2B shows an embodiment of a FD coder 211 and part of the switching procedure 209 according to the present disclosure. The Transition Indicator 219 indicates one of four (4) possible "transitions". An FD to FD transition indicates that the coder is selected or triggered to continue encoding the frame according to an FD coding mode, while a TD to TD transition indicates that the coder is selected or triggered to continue encoding the frame according to a TD coding mode.

For an FD to FD transition (see central signal processing path of FIG. 2B), the input signal frame 105 of size N is processed according to well known frequency domain coding methods. An overlapped input signal frame with the previous input signal frame 103 is formed (see 227 in FIG. 2B). The current input signal frame k 103 may be stored in memory to be used as previous input signal frame for the next input signal frame k+1. A windower may be deployed which applies an MDCT window 231 weighting on the 2N signal values of the overlapped input signal frame. The resulting windowed signal is transformed to the frequency domain using the MDCT 229. The transformed signal represented by N spectral coefficients is then further processed (see 233 in FIG. 2B), for example using quantization, such as scalar or vector quantization and data compression, such as Huffman coding or arithmetic coding.

For an FD to TD transition (see left hand signal processing path of FIG. 2B), the input signal frame 105 of size N is processed according to the present disclosure. An overlapped input signal frame with the previous input signal frame 103 is formed (see 227 in FIG. 2B), similarly as for the case of an FD to FD transition. A windower may be deployed which applies a window 101 as described based on FIG. 1 on the 2N signal values of the overlapped input signal frame. The resulting windowed signal is transformed to the transformed-domain using, for example, the inventive transformer 403, whose functionality will be described later in more detail. These spectral coefficients are then further processed, similarly to the FD to FD transition, for example using quantization, such as scalar or vector quantization and data compression, such as Huffman coding or arithmetic coding.

For a TD to FD transition (see right hand signal processing path of FIG. 2B), the input signal frame 105 of size N is processed according to the present disclosure. An overlapped input signal frame with the previous input signal frame 103 is formed (see 227 in FIG. 2B), similarly as for the case of an FD to FD transition. A windower may be deployed which applies a mirrored window 235 as described based on FIG. 1 on the 2N signal values. The resulting windowed signal is transformed to the transformed-domain using, for example, the inventive transformer 403. The transformed signal is represented by N−M spectral coefficients and is then further processed (see 233 of FIG. 2B), similarly to the FD to FD transition, for example using quantization, such as scalar or vector quantization and data compression, such as Huffman coding or arithmetic coding.

Figure 2C:
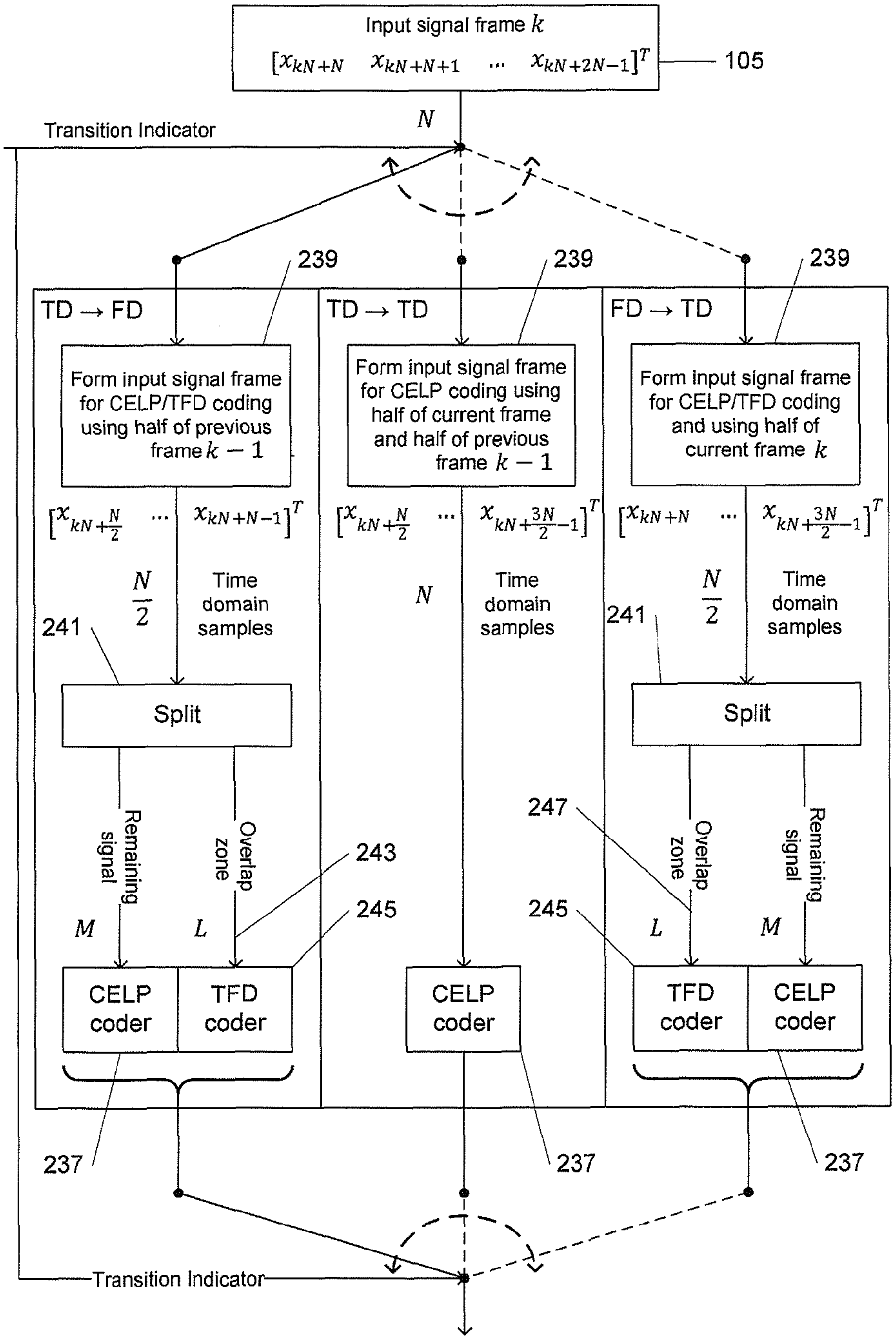
FIG. 2C shows a block-diagram of an embodiment of a time-domain processing block, which may be used in the encoder of FIG. 2A.

FIG. 2C shows an embodiment of a TD coder 213 and parts of the switching procedure 209 according to the present disclosure. In a similar fashion as in FIG. 2B, the Transition Indicator 219 indicates one of four (4) possible transitions. An FD to FD transition indicates that the coder is selected or triggered to continue encoding the frame according to an FD coding mode, while a TD to TD transition indicates that the coder selects is selected or triggered to continue encoding the frame according to a TD coding mode.

For a TD to TD transition (see central signal processing path of FIG. 2C), the input signal frame 105 of size N is processed according to well known time-domain coding methods, in particular, in this embodiment a CELP coder 237 is used. A CELP input signal frame of size N comprising the first half of the current input signal frame k 105 and the last half of the previous input signal frame k−1 103 is formed (see 239 of FIG. 2C). The second half of the current input signal frame k 105 may be stored in memory to be used as previous input signal frame for processing the next input signal frame k+1. The resulting time domain samples representing the CELP input signal frame of size N are further processed by the CELP coder 237.

For an FD to TD transition (see right hand signal processing path of FIG. 2C), the current input signal frame k 105 of size N is processed according to the present disclosure. First, a half input signal frame is formed using the first half of the current input signal frame k 105. The resulting N/2 input signal samples are split (see 241 in FIG. 2C) into an overlap zone 247 of size L which is encoded by a Time-frequency domain (TFD) coder 245(see also 907 in FIG. 9) and the remaining M signal samples which may be encoded by a CELP coder 237(see also 909 in FIG. 9). One embodiment of the TFD coder 245 is to reuse CELP as a coding system; another embodiment of this coder 245 may use a modification of the CELP coder in order to take into account the correlation of the resulting FD coding of the overlap zone which is both coded by the FD coder and the TFD coder during a transition.

For a TD to FD transition (see left hand signal processing path of FIG. 2C), the operations described for the FD to TD transition are mirrored. The input signal frame 105 of size N is processed according to the present disclosure by forming a half input signal frame comprising the first half of the previous input signal frame k−1 103. The resulting N/2 input signal samples are split (241) into an overlap zone 243 of size L which is encoded by a Time-frequency domain (TFD) coder 245 (see also 919 in FIG. 9) and the remaining M signal samples which may be encoded by a CELP coder 237 (see also 917 in FIG. 9).

Figure 2D:
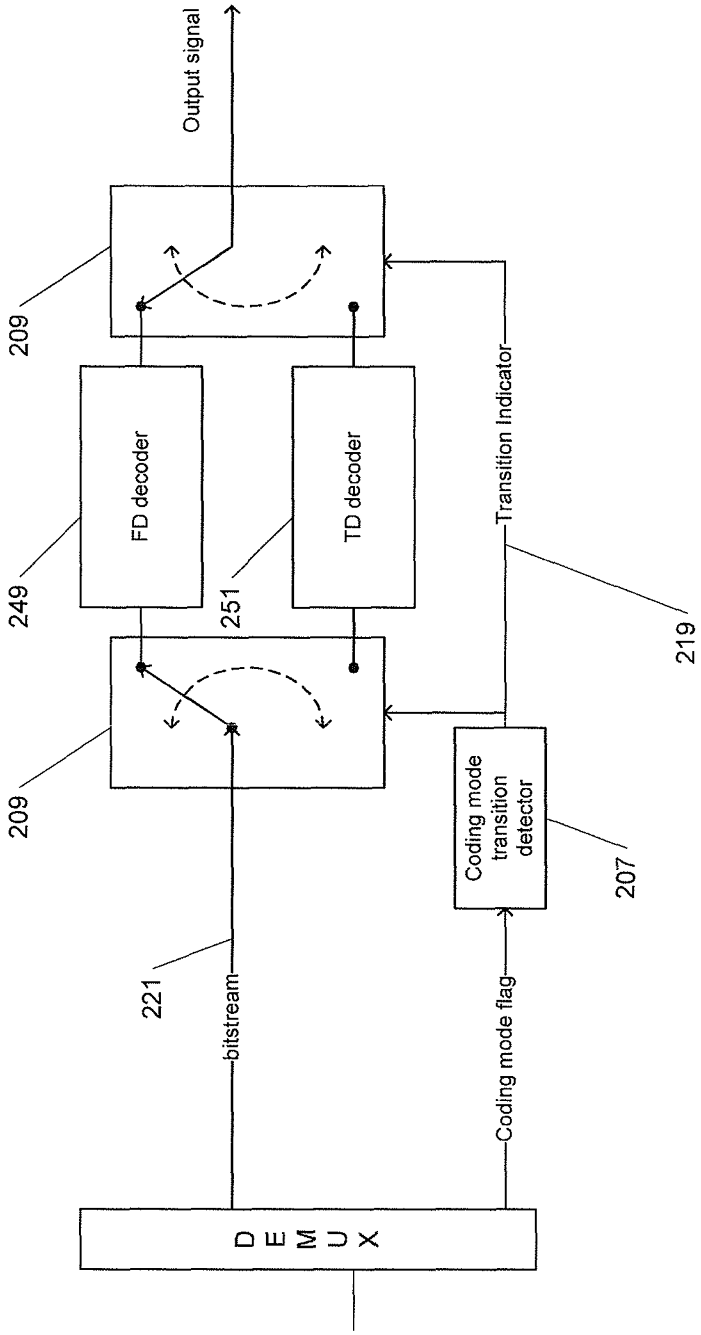
FIG. 2D shows a block-diagram of an embodiment of a decoder.

FIG. 2D shows a decoder according to the present disclosure. The coding mode flag 205 is first read and processed similarly as in the encoder by the coding mode transition detector 207 to determine the transition Indicator 207. The bitstream 221 is decoded by the FD decoder and/or the TD decoder. The FD decoder 249 operates in an inverse fashion to the FD encoder 211, for instance that of FIG. 2B, and comprises the inventive inverse transformer 415 and windower. The TD decoder 251 operates in an inverse fashion to the TD coder 213. For the overlap zone 243, 247 between the TD decoder and the FD decoder, for example, for the TFD decoded overlap zone, an overlap-add operation may be deployed in order to smooth the transition from the FD coding mode to TD coding mode and vice versa. An overlap-add operation may also be deployed for the FD coding mode, after an inverse MDCT or after the inventive inverse transformer 415 in order to synthesize the decoded signal.

Figure 2E:
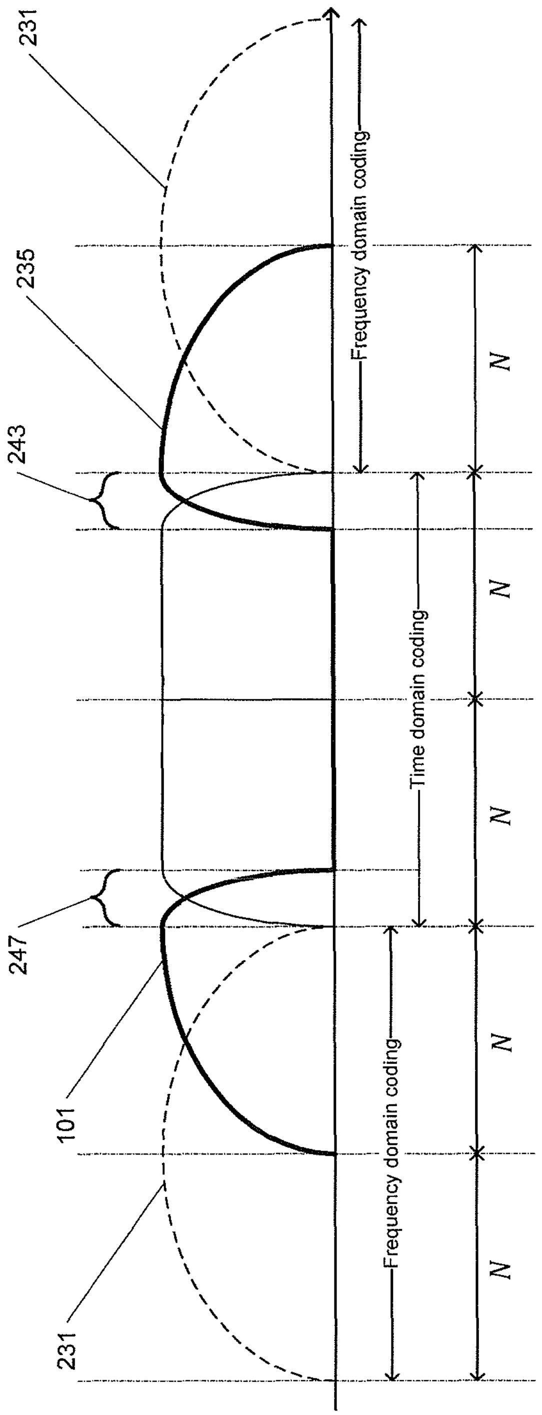
FIG. 2E shows an embodiment of windowing during a transition between transformed-domain and time-domain coding.

FIG. 2E demonstrates a deployment of the window as shown in FIG. 1 for a transition between frequency-domain coding, or more generally transformed-domain coding, for example using the MDCT as a transform, to time-domain coding, for example using Code Excited Linear Prediction (CELP) coding and vice versa. The frequency domain coding forms an embodiment of a transformed-domain processing or transformed-domain processing mode, wherein the time-domain coding forms an embodiment of a time-domain processing or time-domain processing mode.

By way of example, for frequency domain coding using an MDCT, a normal MDCT window 231) may be deployed on an overlapped input signal frame formed by the two leftmost frames of size N (the first frame forming the previous frame of the current or second frame). With the beginning of a first frame (third frame of size N from left) of the input signal for which the TD coding mode has been selected, the window 101 may be deployed on a next overlapped input signal frame (formed now by the second and third frame from left, the third frame from left forming the current signal frame 105 according to FIG. 1) for a transition from frequency domain coding to time domain coding. In time domain coding, the signal is encoded without windowing. For a transition from time-domain coding to frequency domain coding, a mirrored window 235 (mirrored version of window 101, see explanations with regard to FIG. 1) may be deployed. The mirrored window 235 results by reversing the order of coefficients of the window 101. As can be seen from FIG. 2E, the window 235 is applied to the overlapped input signal frame formed by the fourth and fifth input signal frame from left (the fifth input signal frame from left forming the current input signal frame for which a FD coding has been selected, and the fourth input signal frame from left forming the previous input signal frame for which TD coding was selected). Thereafter, in frequency domain processing, the MDCT window 231 may again be used. As depicted in FIG. 2E, the overlap portions 247 and 243 of the windows 101, 235 allow a smooth transition and a reduction of blocking effects during transitions.

With respect to the embodiments of FIGS. 1 and 2A to 2E, it is noted that the time-domain and frequency domain codecs may be synchronized, which is not possible with the prior art USAC scheme. It may also be noted that the switching window shapes 101, 235 for switching from FD (frequency domain) to TD (time domain) and back is different from that of the prior art USAC scheme. As the overlap region starts at half the MDCT frame, the inventive windower allows both coding in the time domain and frequency domain to start at regularly spaced signal intervals and therefore does not loose synchronization between the time-domain and the frequency domain codecs.

Thus, according to some implementation forms, the entire frame of an input signal may be encoded with a constant bit rate. Furthermore, a packetization scheme may be realized which allows for a time alignment between packets and corresponding time signals.

According to some implementation forms, the window 235 for a transition from TD to FD is exactly the mirror (time reversed) version of the window 101 for a transition from FD to TD. The overlap region or zone 243 is however now before the start of the current frame such that the centre of the window 235 corresponds exactly to the start of the current input signal frame to be frequency-domain encoded. Therefore, switching back to FD coding mode may also be performed without any loss of synchronization, wherein a constant bit rate may be achieved.

Figure 8:
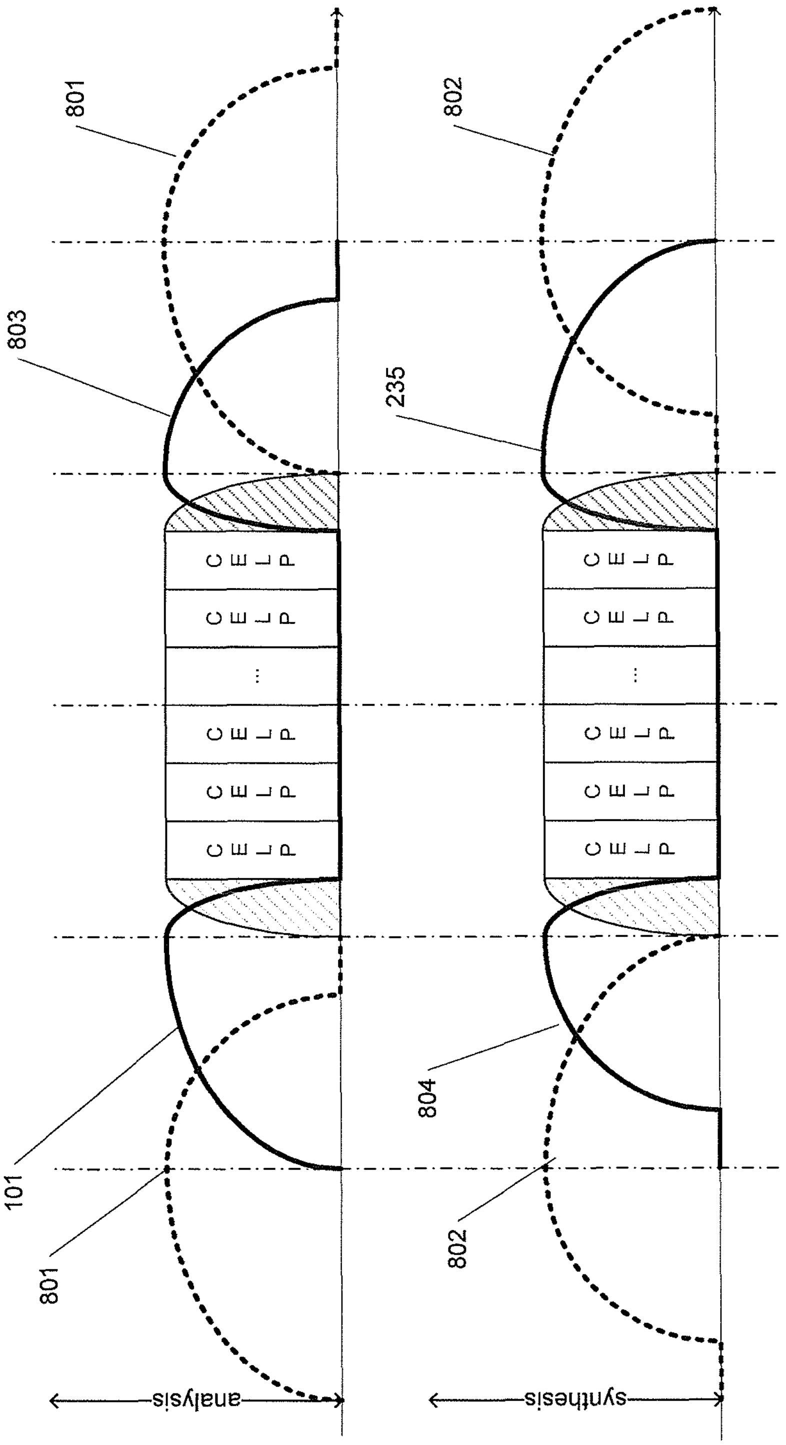
FIG. 8 shows a deployment of windows of a windower according to an implementation form.

According to other implementation forms as it will be apparent in reference to FIG. 8 the window 803 used for a transition from TD to FD although not being the mirrored version of the window 101 used for the FD to TD transition also maintains synchronization between TD and FD coders.

In the following, some general properties of the MDCT which will be used for explaining some implementation forms of the present disclosure will be derived.

Usually, the Modified Discrete Cosine Transform MDCT is defined for an input of size 2N, wherein the input signal is comprised of two consecutive input signal frames of length N, as follows:

$$X_k = \sum_{n=0}^{2N-1} x_n \cos\left(\frac{\pi}{N}\left(n + \frac{1}{2} + \frac{N}{2}\right)\left(k + \frac{1}{2}\right)\right)$$

wherein $X_k$ denotes the MDCT spectral coefficient, k denotes a frequency index in the range 0 to N−1 and n denotes a time index in a range from 0 to 2N−1.

It can be shown that the MDCT can be written as a time-domain aliasing (TDA) operation followed by a type IV Discrete Cosine Transform (DCT), denoted (DCT-IV). The TDA operation can be given by the following matrix operation:

$$T_N \begin{bmatrix} 0 & 0 & -J_{\frac{N}{2}} & -I_{\frac{N}{2}} \\ I_{\frac{N}{2}} & -J_{\frac{N}{2}} & 0 & 0 \end{bmatrix}$$

where the matrices $$I_{\frac{N}{2}} \text{ and } J_{\frac{N}{2}}$$

denote the identity and the time-reversal matrices of order $$\frac{N}{2}$$

$$I_{\frac{N}{2}} = \begin{bmatrix} 1 & & 0 \\ & \ddots & \\ 0 & & 1 \end{bmatrix}, \text{ and } J_{\frac{N}{2}} = \begin{bmatrix} 0 & & 1 \\ & \ddots & \\ 1 & & 0 \end{bmatrix} \qquad \text{A)}$$

Note that as the matrix $T_N$ has half as many rows as columns, it is a rectangular matrix of dimension N×2N, thus making the length of the output signal half that of the input signal.

The DCT-IV is defined as $$X_k = \sum_{n=0}^{N-1} x_n \cos\left(\frac{\pi}{N}\left(n + \frac{1}{2}\right)\left(k + \frac{1}{2}\right)\right)$$

The DCT-IV is its own inverse (up to a scale factor in this equation). We denote $C_N^{IV}$ the DCT-IV square N×N matrix whose elements are:

$$c_{kl}^{IV} = \sqrt{\frac{2}{N}} \cos\left(\frac{\pi}{N}\left(l + \frac{1}{2}\right)\left(k + \frac{1}{2}\right)\right)$$

$$c_{kl}^{IV} = \sqrt{\frac{2}{N}} \cos\left(\frac{\pi}{N}\left(l + \frac{1}{2}\right)\left(k + \frac{1}{2}\right)\right)$$

$$k = 0, \ldots, N-1, l = 0, \ldots, N-1$$

The normalization factor $$\sqrt{\frac{2}{N}}$$

guarantees that $$C_N^{IV} C_N^{IV^T} = C_N^{IV^2} = I$$

The DCT-IV is its own inverse. The MDCT can then be factorized as:

$$M_N = C_N^{IV} T_N$$

Because the MDCT is an N×2N matrix it maps a signal block of length 2N to a spectrum of length N. The inverse MDCT is well defined, however, since the MDCT is not a one-to-one transform, the so called inverse is only a pseudo-inverse. In fact, perfect reconstruction is only obtainable by using an overlap add operation. The inverse MDCT is defined by the matrix:

$$M_N^{\dagger} = T_N^{\dagger} C_N^{IV}$$

Where the matrix $T_N^{\dagger}$ is an 2N×N time matrix that we will call inverse time-domain aliasing and is given by:

$$T_N^{\dagger} = \begin{bmatrix} 0 & I_{N/2} \\ 0 & -J_{N/2} \\ -J_{N/2} & 0 \\ -I_{N/2} & 0 \end{bmatrix}$$

Note that the total operation, assuming no coding or processing of the spectral coefficients is performed, is equivalent to applying the following transform to the input signal:

$$M_N^{\dagger} M_N = T_N^{\dagger} C_N^{IV} C_N^{IV} T_N = T_N^{\dagger} T_N = \begin{bmatrix} I_N & -J_N & 0 & 0 \\ -J_N & I_N & 0 & 0 \\ 0 & 0 & I_N & J_N \\ 0 & 0 & J_N & I_N \end{bmatrix}$$

As earlier stated, perfect reconstruction is only obtained by overlap-adding the signal portions corresponding to the second half of the previous windowed synthesis signal and the first half of the current windowed synthesis signal.

When the MDCT is used as a filter bank, as for example in audio processing and coding/decoding applications, a windowing operation is needed in order to extract a meaningful and parsimonious representation of the signal which is suitable for processing and coding.

In a matrix representation, the windowing operation is a diagonal matrix applied on the input, which may be given by the following diagonal matrix of weights:

$$W_N = \begin{bmatrix} w_0 & 0 & & 0 \\ 0 & w_1 & \ddots & \\ & \ddots & \ddots & 0 \\ 0 & & 0 & w_{2N-1} \end{bmatrix}$$

The more general form of a cosine modulated filter bank based on the MDCT is obtained by allowing different analysis and synthesis windows. This is also called bi-orthogonal filter bank. It means that the synthesis window is defined as:

$$F_N = \begin{bmatrix} f_0 & 0 & & 0 \\ 0 & f_1 & \ddots & \\ & \ddots & \ddots & 0 \\ 0 & & 0 & f_{2N-1} \end{bmatrix}$$

that is applied at the output of the inverse MDCT (IMDCT) operation.

The conditions for perfect reconstruction for the filter bank may be summarized as follows:

$$f_i = \mu_i w_{2N-1-i}, i = 0, \ldots, 2N-1$$

And $\mu_i$ is doubly symmetric sequence, the first quarter of the sequence is given by $$\mu_i = \frac{1}{w_{N+i}w_{N-1-i} + w_{2N-1-i}w_i}, n = 0, \ldots, \frac{N}{2} - 1$$

In some applications, it is desirable to have identical magnitude responses for the analysis and synthesis filters, e.g., in audio coders where it is important to have narrow analysis filters for efficient redundancy reduction and narrow synthesis filters for effective application of psycho-acoustic models for the irrelevance reduction. This symmetry is inherent in orthogonal filter banks, where analysis and synthesis filters are time reversed versions of each other. This is, in general, not the case for bi-orthogonal filters.

For the following development, we would like to be as general as possible, but still keep this nice property of symmetric analysis and synthesis frequency responses.

This condition actually implies that the analysis and synthesis windows are time reversed versions of each other:

$$f_i = w_{2N-1-i}, i = 0, \ldots, 2N-1$$

It also implies that the analysis (or synthesis) window may verify:

$$w_{N+i}w_{N-1-i} + w_{2N-1-i}w_i = 1, i = 0, \ldots, \frac{N}{2} - 1$$

Which comes from the requirement that $\mu_i = 1$, i=0, . . . , 2N−1.

In the following we will assume that these conditions are verified. The objective of having these conditions as general as possible is to later show the applicability of the present disclosure for a large class of MDCT analysis and synthesis windows, including for instance low delay windows which are known to be unsymmetrical, as will be shown in FIG. 8.

The overlapped input signal frame is denoted by the 2N-dimensional vector:

$$x^{(k)} = \begin{bmatrix} x_0^{(k)} \\ x_1^{(k)} \\ x_2^{(k)} \\ x_3^{(k)} \end{bmatrix} = [x_{kN} \quad x_{kN+1} \quad \ldots \quad x_{kN+2N-1}]^T$$

Note that the overlapped input signal frame is represented by four segments or subframes, e.g. a first and a second half of a previous input signal frame 103 and a first and a second half of a current input signal frame 105. The window may also be represented by 4-a block diagonal matrix of diagonal matrices.

$$W_N = \begin{bmatrix} W_N^{(0)} & 0 & 0 & 0 \\ 0 & W_N^{(1)} & 0 & 0 \\ 0 & 0 & W_N^{(2)} & 0 \\ 0 & 0 & 0 & W_N^{(3)} \end{bmatrix}$$

The N-dimensional output of the windowing and time-domain aliasing operation will be denoted by $u^{(k)}$:

$$u^{(k)} = \begin{bmatrix} r^{(k)} \\ s^{(k)} \end{bmatrix} = T_N W_N x^{(k)} = \begin{bmatrix} 0 & 0 & -J_{\frac{N}{2}} & -I_{\frac{N}{2}} \\ I_{\frac{N}{2}} & -J_{\frac{N}{2}} & 0 & 0 \end{bmatrix} \begin{bmatrix} W_N^{(0)}x_0^{(k)} \\ W_N^{(1)}x_1^{(k)} \\ W_N^{(2)}x_2^{(k)} \\ W_N^{(3)}x_3^{(k)} \end{bmatrix} = \begin{bmatrix} -W_N^{(3)}x_3^{(k)} & -J_{\frac{N}{2}}W_N^{(2)}x_2^{(k)} \\ W_N^{(0)}x_0^{(k)} & -J_{\frac{N}{2}}W_N^{(1)}x_1^{(k)} \end{bmatrix}$$

where the vectors $r^{(k)}$ and $s^{(k)}$ are the upper and lower half, i.e. these vectors have a dimension N/2.

Without any processing, the DCT-IV cancels each other, and the output of the inverse MDCT prior to windowing is equal to:

$$T_N^{\dagger}u^{(k)} = \begin{bmatrix} s^{(k)} \\ -\tilde{s}^{(k)} \\ -\tilde{r}^{(k)} \\ -r^{(k)} \end{bmatrix} = \begin{bmatrix} W_N^{(0)}x_0^{(k)} - J_{\frac{N}{2}}W_N^{(1)}x_1^{(k)} \\ -J_{\frac{N}{2}}W_N^{(0)}x_0^{(k)} + W_N^{(1)}x_1^{(k)} \\ J_{\frac{N}{2}}W_N^{(3)}x_3^{(k)} + W_N^{(2)}x_2^{(k)} \\ W_N^{(3)}x_3^{(k)} + J_{\frac{N}{2}}W_N^{(2)}x_2^{(k)} \end{bmatrix}$$

The "tilde" operation means time-reversal (basically a multiplication by the matrix $$J_{\frac{N}{2}}).$$

With similar notations for the synthesis window:

$$F_N = \begin{bmatrix} F_N^{(0)} & 0 & 0 & 0 \\ 0 & F_N^{(1)} & 0 & 0 \\ 0 & 0 & F_N^{(2)} & 0 \\ 0 & 0 & 0 & F_N^{(3)} \end{bmatrix}$$

The output vector can be verified to lead to $$y^{(k)} = \begin{bmatrix} y_0^{(k)} \\ y_1^{(k)} \\ y_2^{(k)} \\ y_3^{(k)} \end{bmatrix} = \begin{bmatrix} F_N^{(0)} W_N^{(0)} x_0^{(k)} - F_N^{(0)} J_N W_N^{(1)} x_1^{(k)} \\ F_N^{(1)} W_N^{(1)} x_1^{(k)} - F_N^{(1)} J_N W_N^{(0)} x_0^{(k)} \\ F_N^{(2)} W_N^{(2)} x_2^{(k)} + F_N^{(2)} J_N W_N^{(3)} x_3^{(k)} \\ F_N^{(3)} W_N^{(3)} x_3^{(k)} + F_N^{(3)} J_N W_N^{(2)} x_2^{(k)} \end{bmatrix}$$

Perfect reconstruction (PR) conditions can be easily verified for the vector $z^{(k)}$ given the assumptions on the analysis and synthesis window, $W_N$ and $F_N$.

Upon the basis of the above framework, an alias-free window, i.e. windower, according to some embodiments may be defined. In this context, an alias free window is a window that leads to a signal which has partially no time aliasing for any input signal.

Basically this means that the time aliased signal:

$$u^{(k)} = \begin{bmatrix} r^{(k)} \\ s^{(k)} \end{bmatrix} = \begin{bmatrix} -W_N^{(3)} x_3^{(k)} - J_{\frac{N}{2}} W_N^{(2)} x_2^{(k)} \\ W_N^{(0)} x_0^{(k)} - J_{\frac{N}{2}} W_N^{(1)} x_1^{(k)} \end{bmatrix}$$

does not contain mirror images.

In this regard, according to some embodiments, a quarter of a window may be set to zero for this to be possible. Thus, at least one of $W_N^{(k)}$, k=0, . . . , 3 may be equal to zero.

Alias free windows are primordial in order to switch between frequency domain and time-domain and vice versa.

Using an alias free frame will allow one to have a portion of the overlap zone, e.g. 247 and 243 alias free and this will allow using methods such as combination of the time-domain coding and frequency domain coding on the overlapped region, for example using TFD coding (245). This is not possible if the overlapped region contains time-domain aliasing since aliasing will destroy the temporal correlations between the signal samples in the time-domain and make the overlap region between time-domain coding and frequency domain coding unusable.

According to some implementation forms relating to switching from FD to TD, the following analysis window may be deployed:

$$\overline{W}_N = \begin{bmatrix} W_N^{(0)} & 0 & 0 & 0 \\ 0 & W_N^{(1)} & 0 & 0 \\ 0 & 0 & W_N^{(2)} & 0 \\ 0 & 0 & 0 & 0 \end{bmatrix}$$

The window may be obtained by setting $W_N^{(3)}=0$. For the sake of brevity, a bar sign has been used on the matrix to distinguish from normal MDCT windowing matrix $W_N$. In a similar fashion, the synthesis window $\overline{F}_N$ will have the matrix form:

$$\overline{F}_N = \begin{bmatrix} F_N^{(0)} & 0 & 0 & 0 \\ 0 & F_N^{(1)} & 0 & 0 \\ 0 & 0 & F_N^{(2)} & 0 \\ 0 & 0 & 0 & 0 \end{bmatrix}$$

In order to guarantee perfect reconstruction, as discussed previously, the first parts of the window: $W_N^{(0)}$ and $W_N^{(1)}$, i.e. corresponding to first or previous input frame 103, are related to the first half part of the synthesis window of the previous frame, for example in reference to FIG. 2E 231, or, as depicted in another implementation forms of FIG. 8, the window 801. Similar observations can also be made on the portions of the synthesis window $F_N^{(0)}$ and $F_N^{(1)}$ corresponding to the first or previous frame. Hence, the first half of the window 101 is constrained by the second half of the MDCT window 231, and entirely dependent on the shape of the MDCT window. Those skilled in the art will appreciate that similar dependencies also exist for the case of switching from time domain to frequency domain. Hence the only free parameters are the window elements in $W_N^{(2)}$.

Let us examine the time-domain aliased signal:

$$u^{(k)} = \begin{bmatrix} r^{(k)} \\ s^{(k)} \end{bmatrix} = \begin{bmatrix} -W_N^{(3)} x_3^{(k)} - J_{\frac{N}{2}} W_N^{(2)} x_2^{(k)} \\ W_N^{(0)} x_0^{(k)} - J_{\frac{N}{2}} W_N^{(1)} x_1^{(k)} \end{bmatrix} = \begin{bmatrix} -J_{\frac{N}{2}} W_N^{(2)} x_2^{(k)} \\ W_N^{(0)} x_0^{(k)} - J_{\frac{N}{2}} W_N^{(1)} x_1^{(k)} \end{bmatrix}$$

The part that will be overlap-added to the previous frame (k−1) corresponds to $s^{(k)}$ The alias free signal of interest is $$r^{(k)} = -J_{\frac{N}{2}} W_N^{(2)} x_2^{(k)}.$$

According to some implementation forms, the TD coding mode may be started as fast as possible and in the same time may be started at the centre of the window, i.e. at frame boundaries to allow synchronization between time domain coding mode and frequency domain coding mode. This may be achieved by setting the whole $W_N^{(2)}$ matrix/window to zero, however at the cost of potential blocking artifacts.

In order to still start the TD coding mode as fast as possible and keep the ability to mitigate or to eliminate the blocking artifacts, the window portion $W_N^{(2)}$ of window 101 as shown in FIG. 1 may be used to window the first sub-frame of the current input signal frame 105. In particular, an overlap region or zone L of the window begins immediately and therefore the coefficients of the window begin decaying immediately after the window centre.

Figure 3:
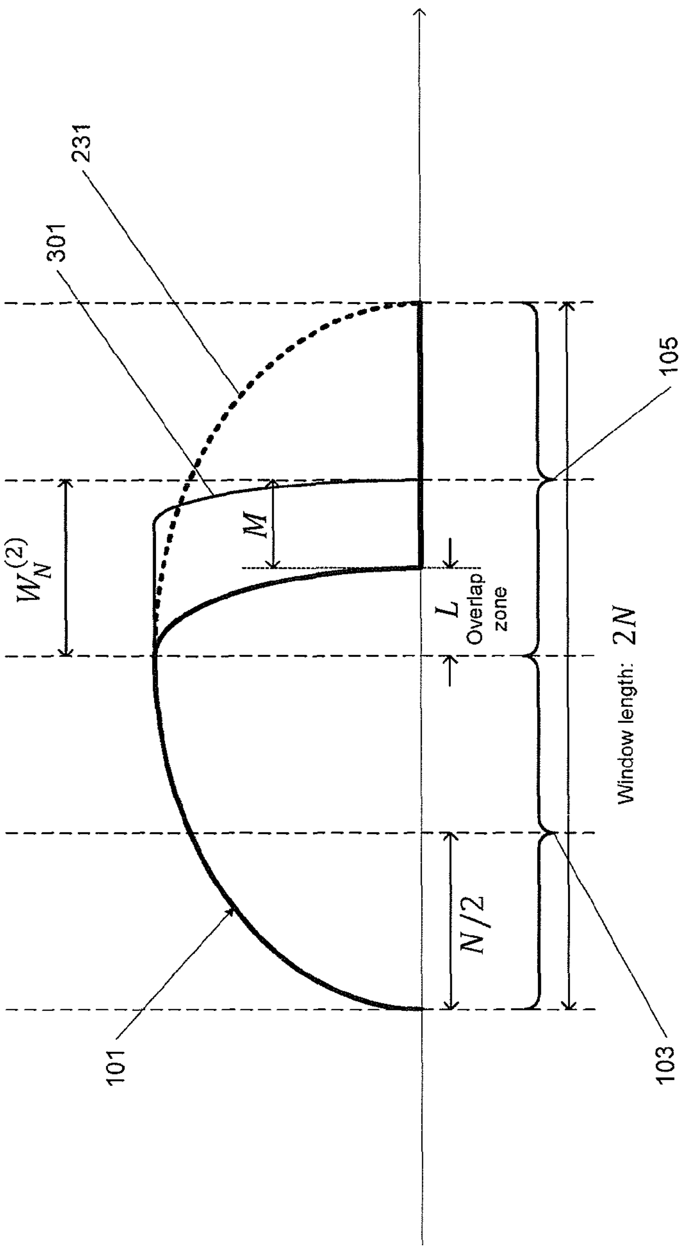
FIG. 3 shows a comparison of windows.

FIG. 3, shows a comparison of the window 101 (bold line), a typical MDCT symmetric window 231 (broken line) and the USAC window 301 (thin line) with regard to the embodiment of FIG. 1. As depicted in FIG. 3, the window 101 has less nonzero coefficients in particular in the first subframe of the second or current frame 105, i.e. in the third subframe of the overlapped input signal frame of length 2N when compared to the windows 231 and 301. Thus, according to some implementations, a faster transition between different domains is achievable.

In the following, we will denote L the length of the overlap region. This means that the window part $W_N^{(2)}$ (i.e. the portion of the window used for weighting or windowing the first subframe of the second or current input signal frame 105) has M=N/2−L zeros zeros. This also means that there are N/2−L zero entries in the segment $r^{(k)}$ and $u^{(k)}$.

It may be noted that because of the matrix $J_{N/2}$, the zeros are located at the start of the vector, i.e.

$$u_k = 0,\ k = 0, \ldots, \frac{N}{2} - L - 1$$

The previous equation states that by anticipating the overlap, one could do a fast switching to the time-domain without increasing the data rate. In this regard, two implementation forms will be described in the following.

A first implementation form is based on keeping the frequency resolution while at the same time encoding only N−L samples in the frequency domain. The remaining coefficients will be obtained by interpolation.

A second implementation form goes beyond the first solution in that it completely changes the modulation scheme, thus changing the frequency resolution of the filter bank without breaking the perfect reconstruction properties of the MDCT. According to the second implementation form, an inventive transformer is deployed such that the frequency resolution may gradually be changed from high spectral resolution, provided by the MDCT, to a purely high time-domain resolution and thus the encoding of the transition frame would be done in a frequency resolution which lies in between full frequency resolution of the FD coding mode and full time resolution of the TD coding mode.

According to some implementation forms, also interpolative coding may be performed, since the time aliased signal may be processed through the DCT-IV in order to obtain the output of the filter bank. Thus, the input $u^{(k)}$ may be sparse and the first M=N/2−L components may be zeros. The DCT-IV of $u^{(k)}$ writes as:

$$v^{(k)} = C_N^{IV} u^{(k)} = C_N^{IV} u^{(k)} = C_N^{IV} \begin{bmatrix} 0 \\ \vdots \\ 0 \\ u_M^{(k)} \\ \vdots \\ u_{N-1}^{(k)} \end{bmatrix} =$$

$$\begin{bmatrix} A_M^{IV} & B_{M,N-M}^{IV} \\ B_{M,N-M}^{IVT} & D_{N-M}^{IV} \end{bmatrix} \begin{bmatrix} 0 \\ \vdots \\ 0 \\ u_M^{(k)} \\ \vdots \\ u_{N-1}^{(k)} \end{bmatrix} = \begin{bmatrix} A_M^{IV} & B_{M,N-M}^{IV} \\ B_{M,N-M}^{IVT} & D_{N-M}^{IV} \end{bmatrix} \begin{bmatrix} 0 \\ e^{(k)} \end{bmatrix}$$

The second equality self defines a block matrix representation of the DCT-IV matrix.

Matrices $A_M^{IV}$ $D_{N-M}^{IV}$ are square of order M and N−M respectively. Matrix $B_{M,N}^{IV}$ is rectangular of dimensionM×(N−M). In addition, $A_M^{IV}$ $D_{N-M}^{IV}$ are symmetric (since $C_N^{IV}$ is symmetric). Given that $C_N^{IV}$ is orthogonal we have:

$$\begin{bmatrix} A_M^{IV} & B_{M,N-M}^{IV} \\ B_{M,N-M}^{IVT} & D_{N-M}^{IV} \end{bmatrix} \begin{bmatrix} A_M^{IV} & B_{M,N-M}^{IV} \\ B_{M,N-M}^{IVT} & D_{N-M}^{IV} \end{bmatrix} =$$

-continued $$\begin{bmatrix} A_M^{IV2} + B_{M,N-M}^{IV} B_{M,N-M}^{IVT} & A_M^{IV} B_{M,N-M}^{IV} + B_{M,N-M}^{IV} D_{N-M}^{IV} \\ B_{M,N-M}^{IVT} A_M^{IV} + D_{N-M}^{IV} B_{M,N-M}^{IVT} & B_{M,N-M}^{IVT} B_{M,N-M}^{IV} + D_{N-M}^{IV2} \end{bmatrix} = \begin{bmatrix} I_M & 0 \\ 0 & I_{N-M} \end{bmatrix}$$

Because we have zero entries, it follows that:

$$v^{(k)} = \begin{bmatrix} B_{M,N-M}^{IV} \\ D_{N-M}^{IV} \end{bmatrix} e^{(k)} = H_{N,N-M}^{IV} e^{(k)}$$

Clearly, $v^{(k)}$ contains redundant information about $e^{(k)}$ in fact the matrix $H_{N,N-M}^{IV}$ has a full rank N−M. One could, in this case, still keep the same frequency resolution, encode only part of the spectrum, i.e. only N−M components and then interpolate the remaining M components. The remaining M components are interpolated by requiring that the DCT-IV of the interpolated N dimensional vector has exactly M zeros. This operation is like a decimation of the output of the DCT-IV where only part of the DCT-IV is comported and coded; the remaining part is interpolated and is closely related to the zero padding properties of the DFT.

According to some implementation forms, higher time resolution coding through modulation frequency change may be performed.

In particular, instead of using the DCT-IV of size N modulation, a modulation may be used in which the analysis, and also the synthesis, filters are centered at the following angular frequencies:

$$\omega_k = \frac{\pi}{N-M}\left(k + \frac{1}{2}\right),\ k = 0, \ldots, N-M-1$$

This means that the modulation matrix writes as the following N−M×N block matrix:

$$[0_{N-M,M} C_{N-M}]$$

And it has N−M outputs instead of N outputs. The actual modulation matrix $C_{N-M}$ is square and has a dimension N−M, while the matrix $0_{N-M,M}$ is a rectangular matrix of zeros. Combining all matrices together shows the overall analysis basis functions of the proposed modified transform writes as:

$$\overline{M}_N = [\,0_{N-M,M} \quad C_{N-M}\,] T_N \overline{W}_N$$

$$\overline{M}_N = [\,0_{N-M,M} \quad C_{N-M}\,] \begin{bmatrix} 0 & 0 & -J_{\frac{N}{2}} & -I_{\frac{N}{2}} \\ I_{\frac{N}{2}} & -J_{\frac{N}{2}} & 0 & 0 \end{bmatrix}$$

$$\begin{bmatrix} W_N^{(0)} & 0 & 0 & 0 \\ 0 & W_N^{(1)} & 0 & 0 \\ 0 & 0 & W_N^{(2)} & 0 \\ 0 & 0 & 0 & 0 \end{bmatrix} = [\,0 \quad C_{N-M}\,] \begin{bmatrix} 0 & 0 & -J_{\frac{N}{2}} W_N^{(2)} & 0 \\ W_N^{(0)} & -J_{\frac{N}{2}} W_N^{(1)} & 0 & 0 \end{bmatrix}$$

If we denote the output of the modified transformer, by the vector whose components are $X_l$, l=0, . . . , N−M then we have:

$$X_k = \sum_{n=0}^{N-M-1} c_{kn} e_n =$$

$$\sum_{n=0}^{N-M-1} c_{kn} u_{n+M} = \sum_{n=M}^{N-1} c_{k,n-M} u_n = \sum_{n=M}^{\frac{N}{2}-1} c_{k,n-M} u_n + \sum_{n=N/2}^{N-1} c_{k,n-M} u_n =$$

$$-\sum_{n=M}^{\frac{N}{2}-1} c_{k,n-M} w^{(2)}\left(\frac{N}{2}-1-n\right)x_2\left(\frac{N}{2}-1-n\right) +$$

$$\sum_{n=N/2}^{N-1} c_{k,n-M}\left\{w^{(0)}\left(n-\frac{N}{2}\right)x_0\left(n-\frac{N}{2}\right) - w^{(1)}(N-n-1)x_1(N-n-1)\right\} =$$

$$-\sum_{n=M}^{\frac{N}{2}-1} c_{k,n-M} w^{(2)}\left(\frac{N}{2}-1-n\right)x_2\left(\frac{N}{2}-1-n\right) + \sum_{n=N/2}^{N-1} c_{k,n-M} w^{(0)}\left(n-\frac{N}{2}\right)x_0\left(n-\frac{N}{2}\right) - \sum_{n=N/2}^{N-1} c_{k,n-M} w^{(1)}(N-n-1)x_1(N-n-1)$$

Ignoring the windows (for simplicity of explanation they are assumed to be absorbed in the signals), we have then:

$$X_k = -\sum_{n=M}^{\frac{N}{2}-1} c_{k,n-M} x\left(N+\frac{N}{2}-1-n\right) + \sum_{n=N/2}^{N-1} c_{k,n-M} x\left(n-\frac{N}{2}\right) - \sum_{n=N/2}^{N-1} c_{k,n-M} x\left(\frac{N}{2}+N-n-1\right) = \sum_{n=0}^{N/2-1} c_{k,n+N/2-M} x(n) - \sum_{n=N/2}^{N-1} c_{k,\frac{3N}{2}-n-1-M} x(n) - \sum_{n=N}^{3N/2-M-1} c_{k,\frac{3N}{2}-1-n-M} x(n)$$

The above equation is of the form:

$$X_k = \sum_{n=0}^{\frac{3N}{2}-1-M} d_{kn} x(n)$$

And $d_{kn}$ are the elements of the new basis functions, note here that the input signal x(n) contains the windowing. The general form of the modulation is:

$$d_{kn} = \cos\left(\frac{\pi}{K}\left(k+\frac{1}{2}\right)n + \phi_k\right)$$

This in fact means that we want to have N−M basis functions which are localized at the frequencies:

$$\omega_k = \frac{\pi}{K}\left(k+\frac{1}{2}\right)$$

This is cosine modulated filter banks with a phase term $\phi_k$. However, here a transition between a high frequency resolution filter bank (i.e. MDCT) and a low resolution filter-bank is accommodated.

Identifying the terms of the two equations, leads to the following set of equations on the modulation matrix $C_{N-M}$:

$$c_{k,n+\frac{N}{2}-M} = c_{k,l} = \cos\left(\frac{\pi}{K}\left(k+\frac{1}{2}\right)n + \phi_k\right),\ n = 0, \ldots, \frac{N}{2}-1,$$

$$l = \frac{N}{2}-M, \ldots, N-1-M$$

$$c_{k,\frac{3N}{2}-1-n-M} = c_{k,l} = -\cos\left(\frac{\pi}{K}\left(k+\frac{1}{2}\right)n + \phi_k\right),$$

$$n = \frac{N}{2}, \ldots, N-1,$$

$$l = N-1-M, \ldots, \frac{N}{2}-M$$

$$c_{k,\frac{3N}{2}-1-n-M} = c_{k,l} = -\cos\left(\frac{\pi}{K}\left(k+\frac{1}{2}\right)n + \phi_k\right),$$

$$n = N, \ldots, \frac{3N}{2}-1-M,$$

$$l = \frac{N}{2}-M-1, \ldots, 0$$

Therefore, it follows that $$c_{k,n} = \cos\left(\frac{\pi}{K}\left(k+\frac{1}{2}\right)\left(n-\frac{N}{2}+M\right) + \phi_k\right),$$

$$n = \frac{N}{2}-M, \ldots, N-M-1$$

$$c_{k,n} = -\cos\left(\frac{\pi}{K}\left(k+\frac{1}{2}\right)\left(\frac{3N}{2}-1-n-M\right) + \phi_k\right),$$

$$n = \frac{N}{2}-M, \ldots, N-M-1$$

$$c_{k,n} = -\cos\left(\frac{\pi}{K}\left(k+\frac{1}{2}\right)\left(\frac{3N}{2}-1-n-M\right) + \phi_k\right),$$

$$n = 0, \ldots, \frac{N}{2}-M-1$$

From the first equations, we derive constraints on the phase and the frequency spacing.

It is easily seen from the first two equations that we have:

$$\cos\left(\frac{\pi}{K}\left(k+\frac{1}{2}\right)\left(n-\frac{N}{2}+M\right) + \phi_k\right) = -\cos\left(\frac{\pi}{K}\left(k+\frac{1}{2}\right)\left(\frac{3N}{2}-1-n-M\right) + \phi_k\right),$$

$$n = \frac{N}{2}-M, \ldots, N-M-1,\ k = 0, \ldots, N-M$$

Because cosines are odd around π, we have $$\cos\left(\frac{\pi}{K}\left(k+\frac{1}{2}\right)\left(n-\frac{N}{2}+M\right) + \phi_k\right) = \cos\left(\frac{\pi}{K}\left(k+\frac{1}{2}\right)\left(\frac{3N}{2}-1-n-M\right) + \phi_k - \pi\right),$$

-continued $$n = \frac{N}{2} - M, \ldots, N - M - 1, k = 0, \ldots, N - M$$

For a certain choice of (k), the solutions of the equation are (the [2π] means that solutions are modulo 2π):

$$\begin{cases} \frac{\pi}{K}\left(k+\frac{1}{2}\right)\left(n-\frac{N}{2}+M\right)+\phi_k = \frac{\pi}{K}\left(k+\frac{1}{2}\right)\left(\frac{3N}{2}-1-n-M\right)+ \\ \qquad \phi_k - \pi[2\pi] \\ \qquad \text{Or} \\ \frac{\pi}{K}\left(k+\frac{1}{2}\right)\left(n-\frac{N}{2}+M\right)+\phi_k = -\frac{\pi}{K}\left(k+\frac{1}{2}\right)\left(\frac{3N}{2}-1-n-M\right)- \\ \qquad \phi_k + \pi[2\pi] \end{cases}$$

In particular, the phase is eliminated according to an implementation form.

According to another implementation form, the following set of equations may be implemented $$\frac{\pi}{K}\left(k+\frac{1}{2}\right)n + \frac{\pi}{K}\left(k+\frac{1}{2}\right)\left(M-\frac{N}{2}\right)+2\phi_k = \frac{\pi}{K}\left(k+\frac{1}{2}\right)n + \pi + \frac{\pi}{K}\left(k+\frac{1}{2}\right)\left(M+1-\frac{3N}{2}\right)\ [2\pi]$$

We see that n disappears leaving $$+2\phi_k = \pi + \frac{\pi}{K}\left(k+\frac{1}{2}\right)\left(\frac{N}{2}+1-\frac{3N}{2}\right)\ [2\pi]$$

$$\phi_k = \frac{\pi}{2} + \frac{\pi}{2K}\left(k+\frac{1}{2}\right)(1-N)\ [\pi]$$

This condition for the phases may be used in order to make sure that the basis functions are derived from a time aliasing and a modulation matrix. Thus, the overlap add with the previous frame may be achieved which leads to perfect reconstruction.

According to some implementation forms with K=N, the phases correspond to the same phases in an MDCT of length 2N.

$$\phi_k = \frac{\pi}{2N}\left(k+\frac{1}{2}\right)(1-N)+\frac{\pi}{2}[\pi] = \frac{\pi}{N}\left(k+\frac{1}{2}\right)\left(\frac{N+1}{2}\right)-2N\frac{\pi}{N}\left(k+\frac{1}{2}\right)+\frac{\pi}{2}[\pi] = \frac{\pi}{N}\left(k+\frac{1}{2}\right)\left(\frac{N+1}{2}\right)-\pi\left(k+\frac{1}{2}\right)+\frac{\pi}{2}[\pi] = \frac{\pi}{N}\left(k+\frac{1}{2}\right)\left(\frac{N+1}{2}\right)[\pi]$$

$$d_{kn} = \cos\left(\frac{\pi}{K}\left(k+\frac{1}{2}\right)n+\phi_k\right) = \cos\left(\frac{\pi}{N}\left(k+\frac{1}{2}\right)\left(n+\frac{N+1}{2}\right)\right)$$

which are the MDCT basis functions forming sets of parameters.

As the phases may be defined modulo it, one may choose:

$$\phi_k = \frac{\pi}{2} + \frac{\pi}{2K}\left(k+\frac{1}{2}\right)(1-N)[\pi] =$$

-continued $$\frac{\pi}{K}\left(k+\frac{1}{2}\right)\left(\frac{1-N}{2}\right)+\frac{\pi}{K}\left(k+\frac{1}{2}\right)K\,[\pi] = \frac{\pi}{K}\left(k+\frac{1}{2}\right)\left(K+\frac{1-N}{2}\right)\ [\pi]$$

Taking the principal branch, leads to the following basis functions, i.e. sets of coefficients:

$$d_{kn} = \cos\left(\frac{\pi}{K}\left(k+\frac{1}{2}\right)\left(n+K+\frac{1-N}{2}\right)\right)$$

There are no other constraints on the phases that come from the last set of modulation equations.

The modulation matrix writes as:

$$c_{k,n} = \cos\left(\frac{\pi}{K}\left(k+\frac{1}{2}\right)\left(n+\frac{1}{2}-N+M+K\right)\right),$$
$$n = 0, \ldots, N-M-1$$

According to some embodiments, K may determine the frequency spacing of the basis functions. Note that we have exactly N−M basis functions. Therefore according to this present disclosure, using K+M−N=0 leads to a frequency spacing of K=N−M and both satisfies maximum frequency spacing between the basis functions and in the same time leads to the following modulation matrix:

$$c_{k,n} = \cos\left(\frac{\pi}{N-M}\left(k+\frac{1}{2}\right)\left(n+\frac{1}{2}\right)\right), n = 0, \ldots, N-M-1$$

which is a DCT-IV but of reduced length N−M than the length N used for the MDCT.

This also translates to the inventive transform being applied to the windowed input signal is given by:

$$X_k = \sum_{n=0}^{\frac{3N}{2}-1-M} d_{kn}x(n),$$

and where the sets of coefficients are given by:

$$d_{kn} = \cos\left(\frac{\pi}{N-M}\left(k+\frac{1}{2}\right)\left(n+\frac{N+1}{2}-M\right)\right),$$
$$k = 0, \ldots, N-M-1, n = 0, \ldots, \frac{3N}{2}-1-M$$

It is understood by those skilled in the art that the inverse transform subject of this present disclosure is readily obtained as the transpose of the inventive transform and is given by the following coefficients.

$$g_{kn} = \cos\left(\frac{\pi}{N-M}\left(k+\frac{1}{2}\right)\left(n+\frac{N+1}{2}-M\right)\right),$$
$$n = 0, \ldots, \frac{3N}{2}-1-M, k = 0, \ldots, N-M-1$$

According to some implementation forms, a fast algorithm for the computation of the DCT-IV may be achieved. Furthermore, maximum frequency spacing between the basis functions, in which oscillations are defined, may be obtained. Additionally, the transform is maximally decimated in the sense that only (N−M) coefficients may need to be transformed and encoded. Furthermore, the transform is guaranteed by construction to have a perfect reconstruction with either the previous MDCT frame, or the following MDCT frame depending on the window implementation forms, for example and in reference to FIG. 2E, the first half of the window 101 and second half of the MDCT window 231 or the first half of the MDCT window 231 and the second half of the window 235.

Figure 4A:
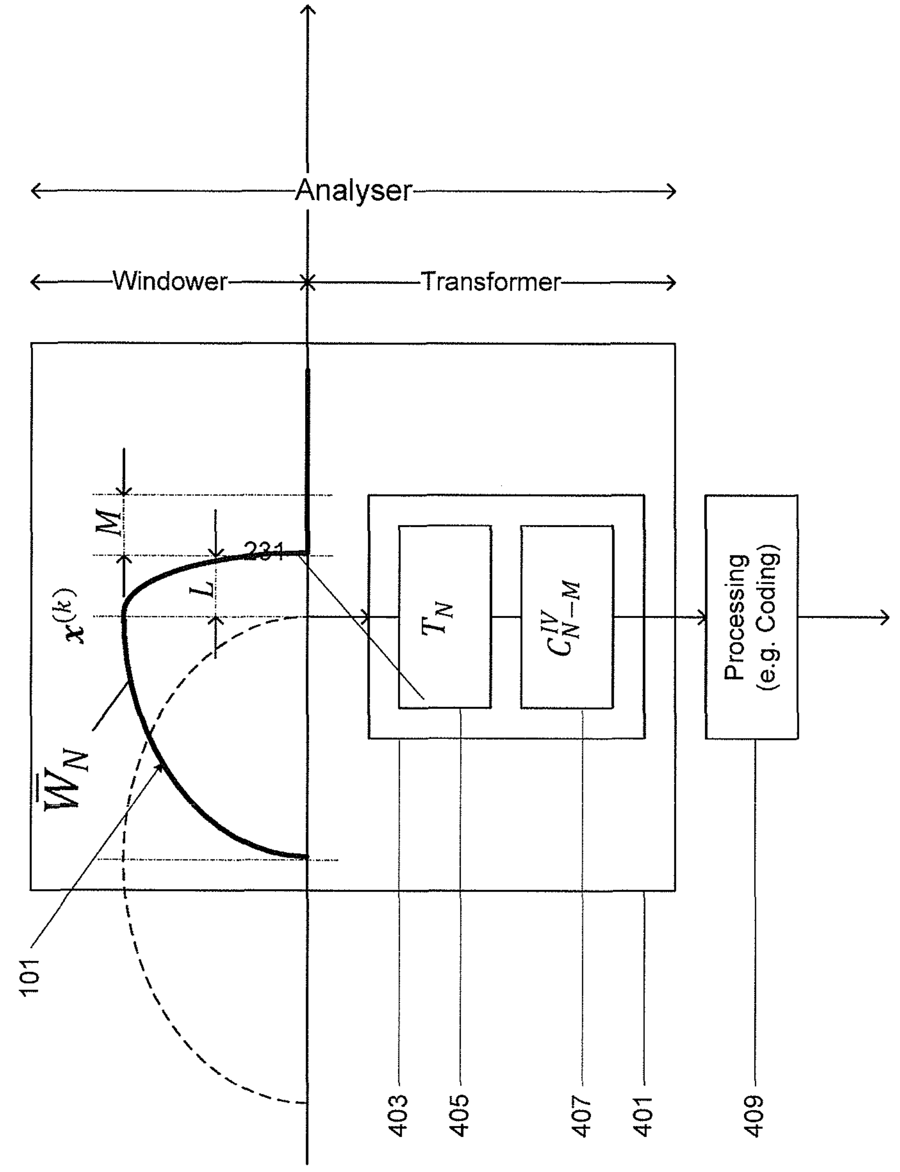
FIG. 4A shows an audio signal analyzer, comprising a windower and a transformer.

An implementation of the above transform may be performed upon use of a DCT-IV of a size N−M. FIG. 4A shows, by way of example, how the transform may be implemented at a switching point, in this case during transition from time-domain mode to frequency domain mode. Note that the deployed DCT-IV transforms have reduced sizes. Also note that the time aliasing operation needs to be computed only for N−M outputs since a large portion of the input is set to zero. When it comes to the processing part, e.g. quantization and/or coding of the spectral coefficients, only N−M spectral coefficients may be encoded.

More specifically, FIG. 4A shows an encoder or coder comprising a signal analyzer 401 according to an implementation form and a processor 409. The analyzer 401 comprises the windower 101 for windowing an input signal to obtain a windowed input signal during a transition from a transformed-domain processing to a time-domain processing. The signal analyzer further comprises a transformer 403 for transforming the windowed signal into a transformed domain, e.g. in to a frequency domain. By way of example, the transformer 403 may comprise a time aliaser 405 for performing a time aliasing operation, and a modulation matrix 407 for modulating the signal provided by the time-domain analyzer 405 using N−M sets of parameters, each set of parameters comprising 3N/2−M parameters. The transformed-domain signal provided by the modulator 407 may be provided to the processor 409 of the encoder. The processor 409 may perform further processing, e.g. quantization and/or coding (e.g. data compression) of the transform coefficients, i.e. transformed-domain signal values.

Figure 4B:
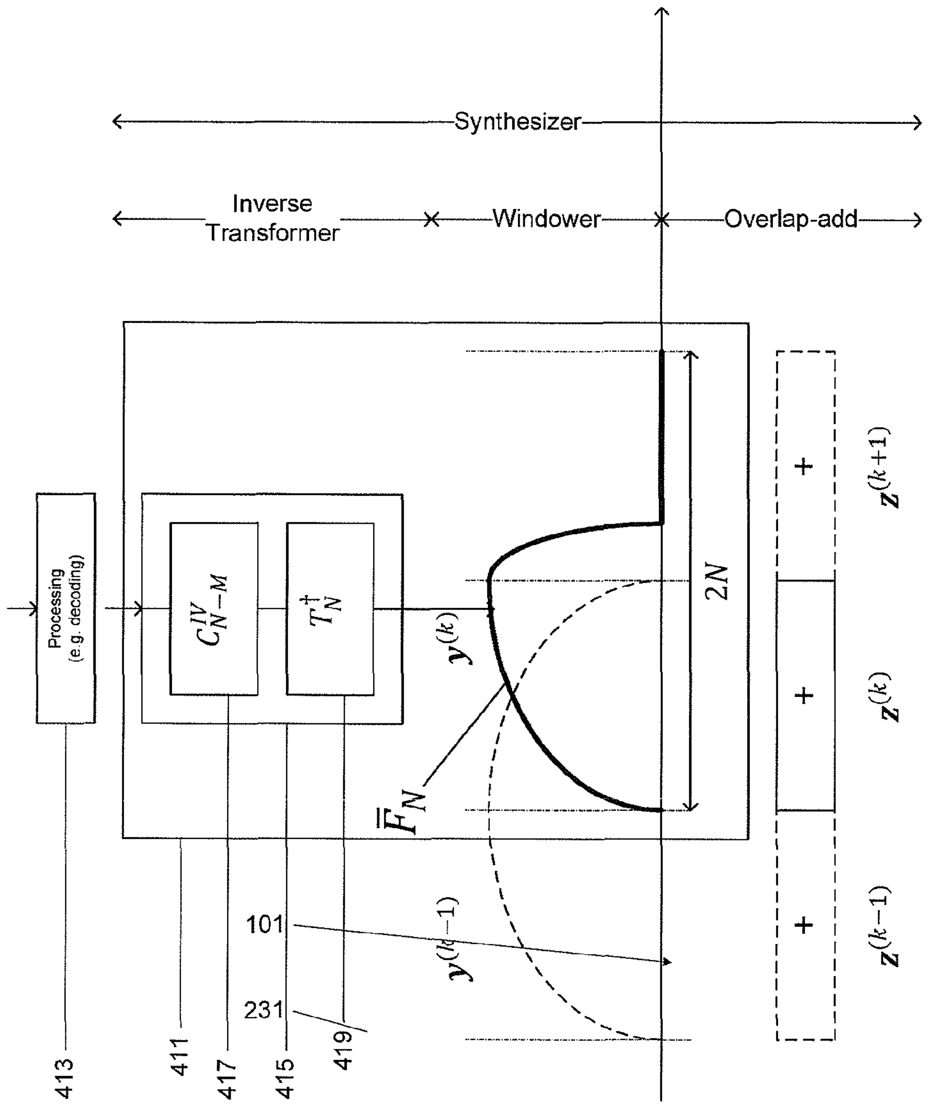
FIG. 4B shows an audio signal synthesizer comprising an inverse transformer and a windower.

The processed signal provided by the processor 409 may be stored or transmitted towards e.g. a signal synthesizer 411 as shown in FIG. 4B.

The decoder of FIG. 4B comprises a processor 413 and a signal synthesizer 411. The signal synthesizer (411) of FIG. 4B comprises an inverse transformer 415 and a windower 101. The processor 413 decodes (e.g. entropy decodes) the transformed-domain signal. The decoded signal provided by the processor 413 is provided to the inverse transformer 415 of the signal synthesizer 411 for inversely transforming the processed signal e.g. in time domain. The inverse transformer comprises by way of example a demodulator 417 and an inverse time aliaser 419. The demodulator 417 is adapted to demodulate the processed signal using sets of parameters, e.g. basis functions, associated with frequency oscillations. The demodulator 417 may be configured to perform an operation which is inversed to that of the modulator 407. The demodulated signal may be provided to the inverse time aliaser 419 performing an operation which is inversed to that of the aliaser 405. The output signal of the inverse time aliaser 419 may be windowed using the window 101 as depicted in FIG. 4B. For certain implementation forms where the MDCT uses symmetric windows, e.g. 231, the windower of the signal synthesizer is, e.g., adapted to use the same window as the signal analyzer, e.g. the window 101 in case the signal analyzer uses the window 101 or the window 235 in case the analyzer uses the window 235 for the case of switching between time-domain processing mode to frequency domain processing mode. In other implementation forms, where the MDCT uses non symmetric windows, in reference to FIG. 8, the analysis may deploy a window 101 and the synthesis may deploy a window 804 for switching from frequency-domain processing mode to time-domain processing mode, whereas for switching from time-domain processing mode to frequency-domain processing mode, the analyser may deploy window 803 while the synthesizer may deploy an adapted window 235. Finally, an overlap-add operation is applied on the windowed output signal of each frame in order to produce the audio output signal.

According to some implementation forms relating to switching from TD to FD, the inverse switching from TD to FD is exactly the mirror image of the switching from FD to TD modes. Thus, the equations are exactly the same, except that they are mirrored (or time-reversed)).

According to some implementation forms, when switching processing or coding modes using the new transform, an overlap-add operation is performed to restore the previous frame, i.e. the first signal frame 103 forming the overlapped input signal frame. As we discussed earlier, this leads to perfect reconstruction of the previous frame if no processing, e.g. coding including quantization (resulting in information loss), is performed.

The second or current signal frame 105 corresponding to the second half of the window is free from aliasing and therefore can be efficiently used in the TD coder, as for instance in the TFD coding mode 245. In some other instances, this synthesis signal can be subtracted from the input signal at the encoder such that the TD coder only encodes the difference and therefore the overlap add operation will add the contribution of the TD coder TFD coder portion and the contribution of the inverse transformer to reconstruct the signal at the decoder.

According to some implementation forms, it may be assumed that L or M is shorter than the length of a CELP sub-frame. Therefore the overlap region does not exceed the size of one sub-frame. The sub-frame which encodes the overlap region may be called a TFD sub-frame.

Figure 5:
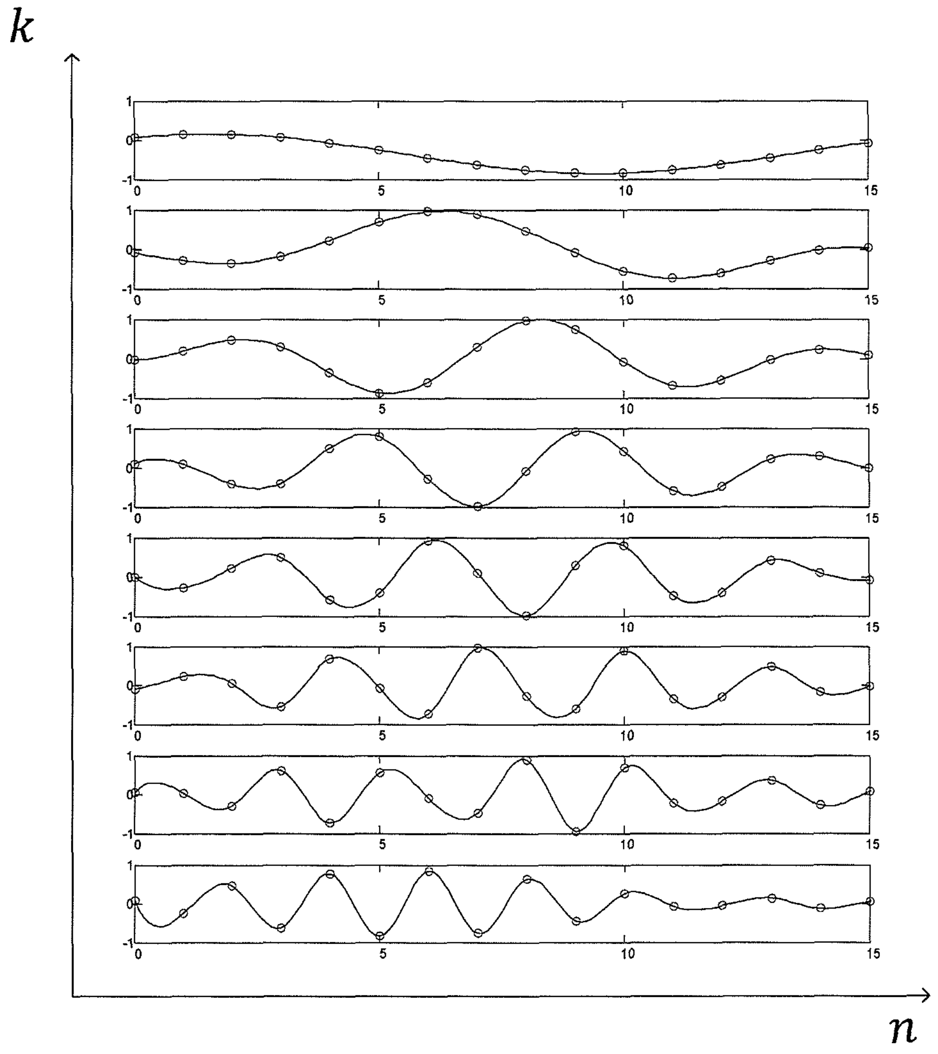
FIG. 5 shows MDCT basis functions.
Figure 6:
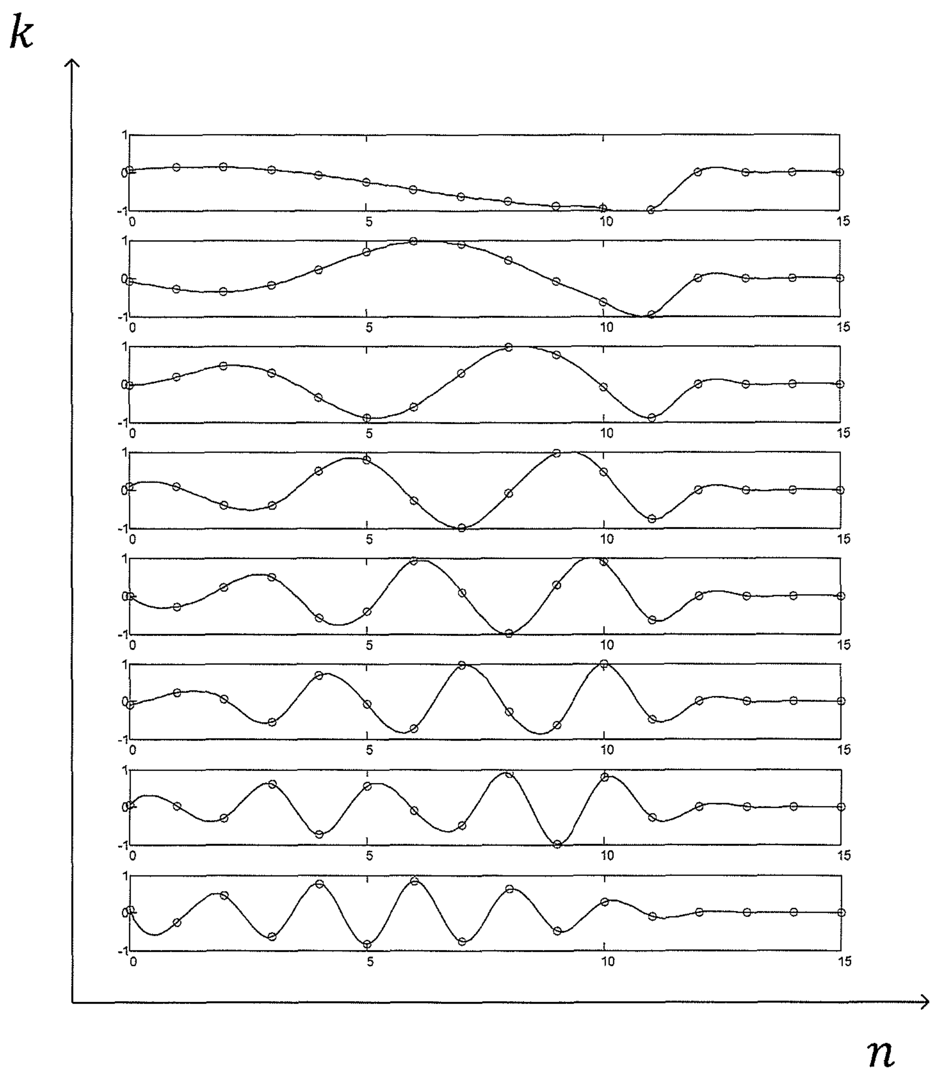
FIG. 6 shows USAC basis functions.
Figure 7:
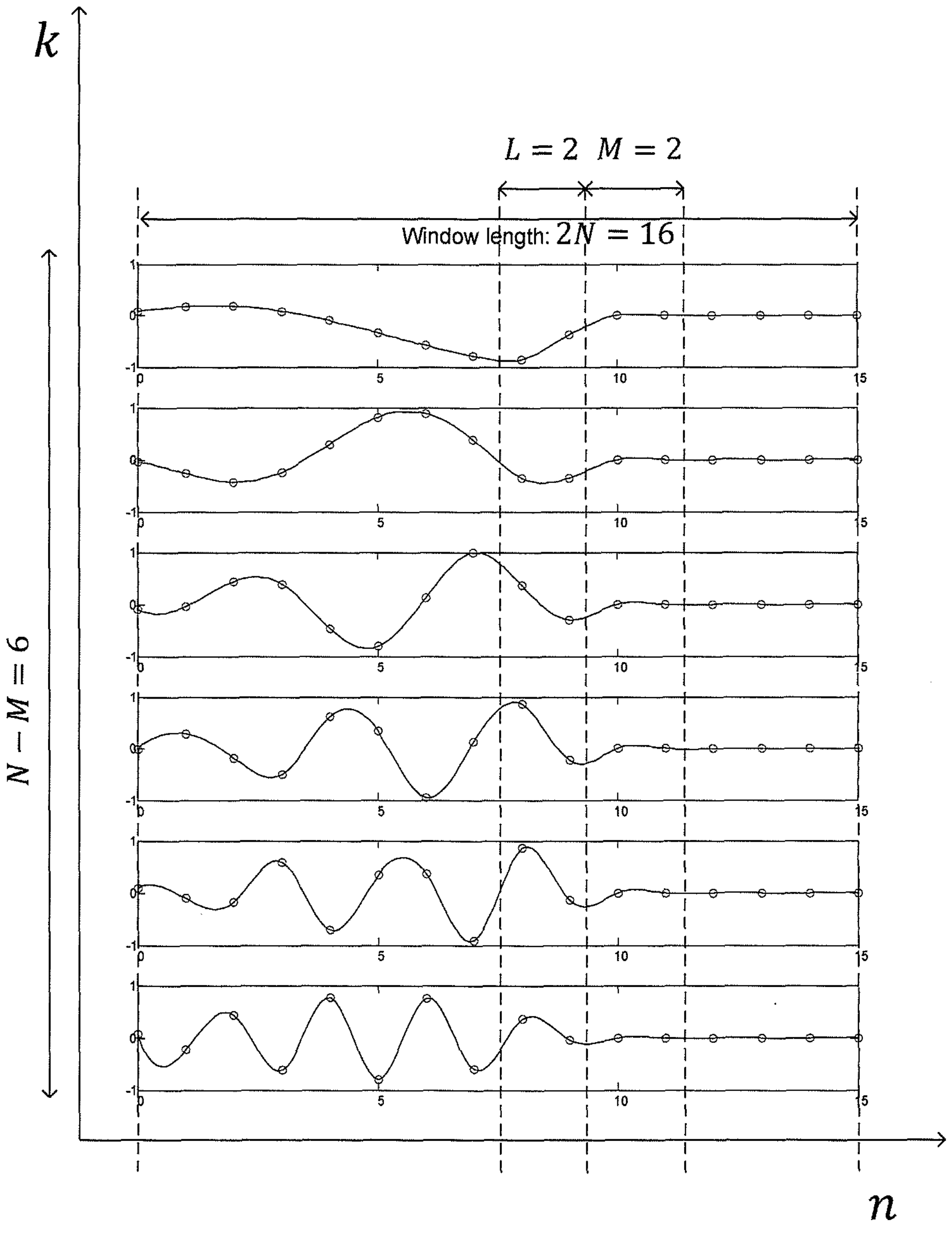
FIG. 7 shows basis functions of an embodiment of a transformer.

In FIGS. 5, 6 and 7, plots of the different basis functions being determined by sets of coefficients are depicted. In particular, FIG. 5 shows sine functions using e.g. eight basis functions for a window size of 16 (i.e. N=8 and 2N=16). FIG. 6 shows, by way of example, USAC switching resulting basis functions with eight basis functions for a window size of 16 (i.e. N=8 and 2N=16). FIG. 7 shows basis functions forming set of coefficients which may be used by the transformer 403. As shown in FIG. 7, for a window size of 16 samples a reduced number of six basis functions may be used for transformation (i.e. N=8, 2N=16, M=2, N−M=6 and 3N/2−M=10).

The plots shown in FIGS. 5 and 6 refer to basis functions obtained from a full MDCT on a windowed signal. The basis functions for the inventive transform discussed herein are shown in FIG. 7, where it is seen that the functions decay rapidly to zero corresponding to the fast switching. Moreover there are less basis functions than the USAC basis functions, which mean there are less spectral coefficients and in general less data to encode at transitions which is advantageous in audio coding applications.

FIG. 8 shows a deployment of windows for switching between time-domain processing mode and transform-domain or frequency-domain processing mode. In this embodiment, the MDCT analysis window 801 for transform-domain coding is non-symmetrical with respect to the window centre. For example, it contains a small portion of zeros. The window 801 is a low delay MDCT window having a rising slope and a falling slope, the falling slope being shorter than the normal MDCT sine window falling slope. According to the perfect reconstruction conditions on the MDCT windows, the MDCT synthesis window 802 is the time reversal or mirrored version of the analysis window 801. According to the present disclosure, in the analysis side, when switching between time domain and frequency domain processing or coding modes, the inventive windower may deploy a window 101 with a rising slope that corresponds to the rising slope of the Low-delay MDCT analysis window 801 for transition between frequency-domain processing mode to time-domain-processing mode. For transition between time domain processing mode to frequency-domain processing mode, the inventive windower may deploy a window 803 with a falling slope that corresponds to a falling slope of the Low-delay MDCT analysis window 801. As earlier stated, the shape of half of the transition window in the analysis side is constrained by the corresponding shape of the MDCT window (symmetric or asymmetric MDCT window) to allow perfect reconstruction. In the synthesis side, when switching between time domain and frequency domain processing or coding modes, the inventive windower may deploy a synthesis window 804 with a rising slope that corresponds to the rising slope of the low-delay MDCT synthesis window 802 for transition between frequency-domain processing mode to time-domain-processing mode and may deploy a window 235 with a falling slope that corresponds to the falling slope of the low delay MDCT synthesis window 802 for transition between time-domain processing mode to frequency-domain processing mode. For such embodiments, the shapes of the analysis and synthesis windows at transitions are different in order to guarantee proper overlap with the corresponding low-delay MDCT synthesis windows. It should be understood by those skilled in the art that variations on the shape of the MDCT windows (analysis and synthesis) for the FD coder will imply variations to the shape of the inventive windower in order to guarantee perfect reconstruction when no processing or coding is performed.

According to some implementation forms, low delay MDCT windows are used for FD coding mode using the MDCT. Low delay MDCT windows are non-symmetric MDCT windows which have a set of trailing zeros at the end of the frame allowing a reduction in look-ahead and therefore a reduction in delay. The analysis and synthesis window are non-symmetric but are time-reversed versions of each other as explained in WO 2009/081003 A1. When using low delay MDCT windows the shape of the inventive analysis window when switching may be slightly different as shown in FIG. 8. The use of the present disclosure combined with an FD coder deploying low delay MDCT windows maintains the advantage of having a low delay FD coder resulting in an overall low delay switched mode coder. Hence, no change to the low delay feature is incurred by the use of this present disclosure. As such, the inventive windower and transformer can be deployed to switch between low-delay MDCT based FD coder to time domain coding while still maintaining the low delay property of these MDCT windows. This is due to when switching between FD coding and TD coding, the present disclosure allows to decode up to 1.5 times of the size of the frame. Thus we can still apply the idea of the transform as described herein and maintain at the same time the low delay property of the MDCT filter bank. The same applies to the switching from TD coding back to frequency domain coding.

Figure 9:
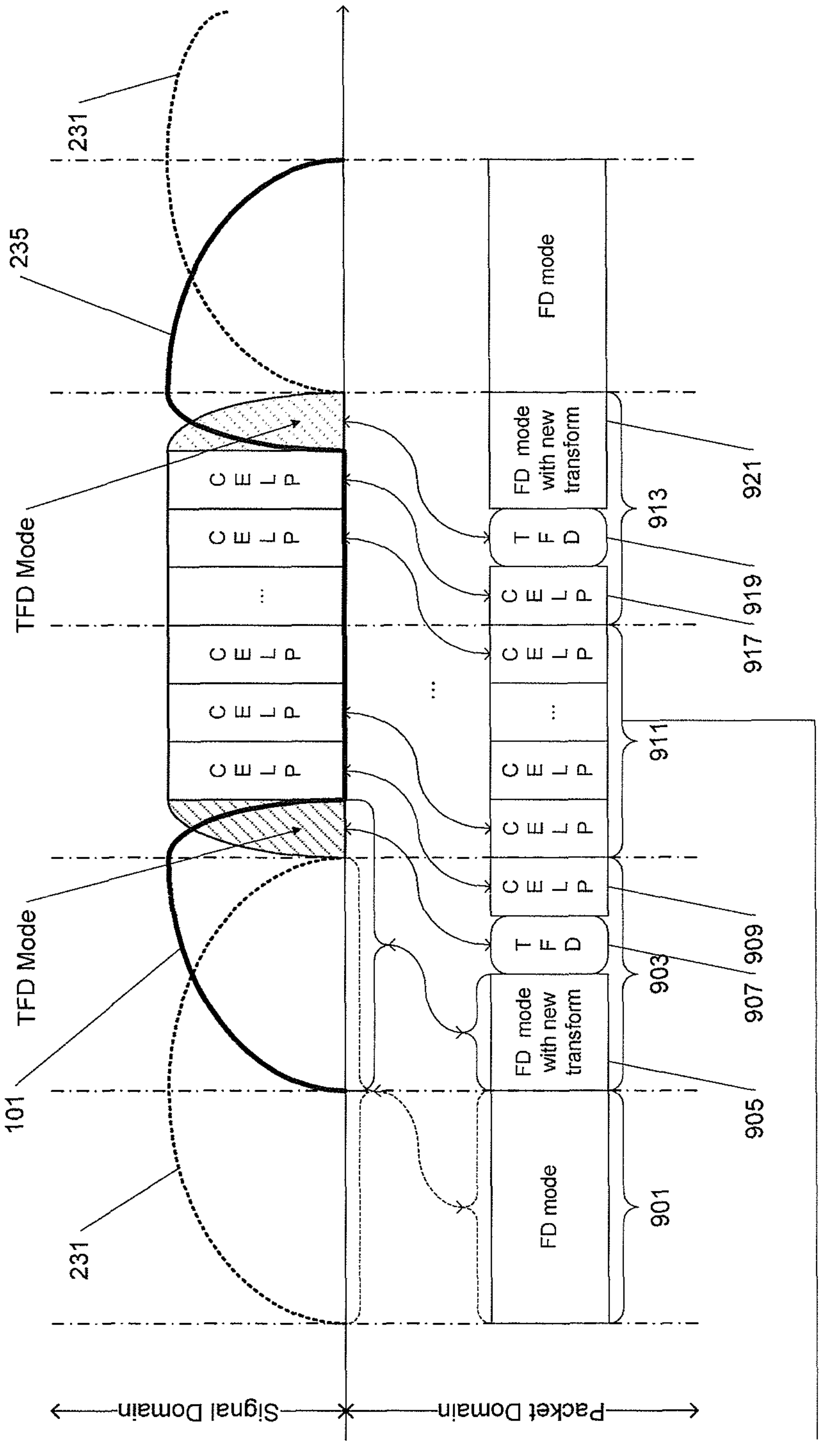
FIG. 9 shows a packetization scheme.
Figure 10:
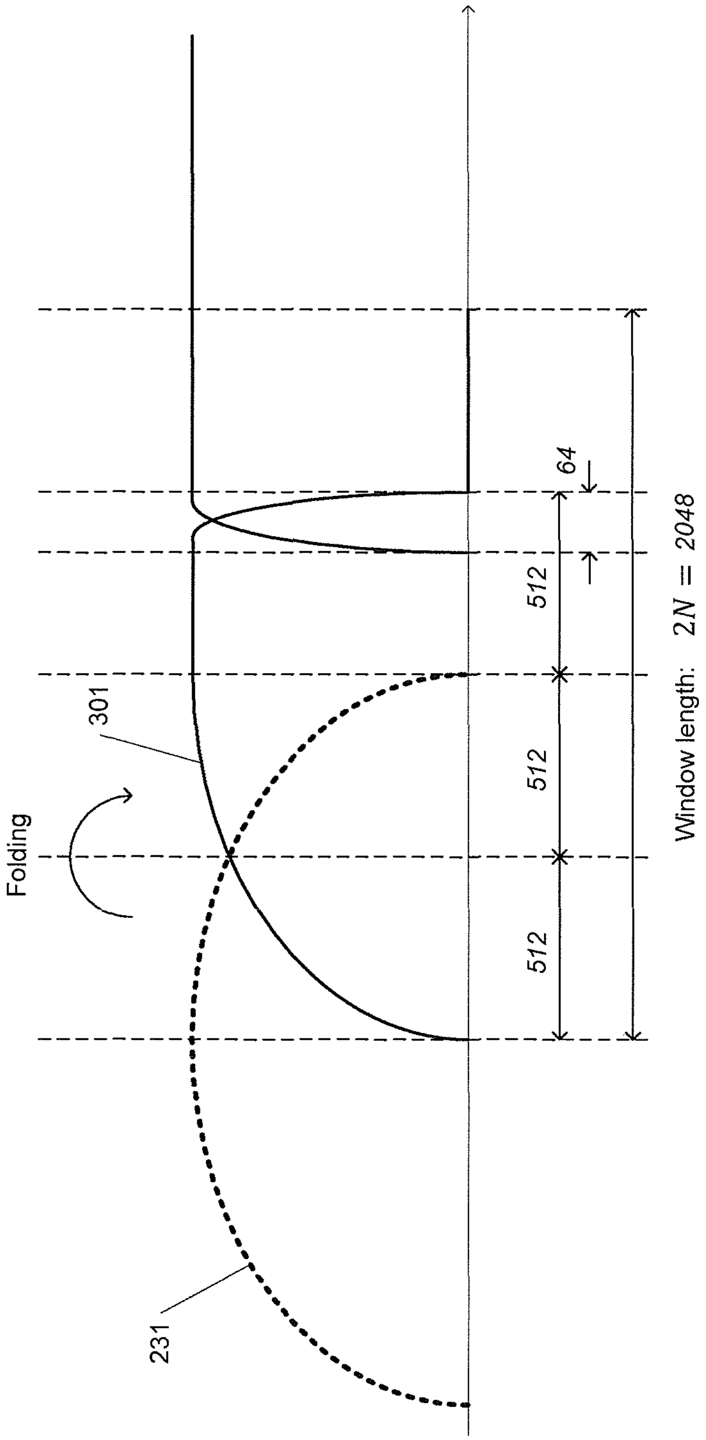
FIG. 10 shows a window scheme for transitions from a NON-LPD mode (FD codec) to a LDP mode (TD codec) according to USAC.

FIG. 9 shows a packetization scheme according to an implementation. As shown in FIG. 9, the signal is processed on a frame-by-frame basis, wherein the frame boundaries of the input signal frames or recovered signal frames of length N are depicted by the vertical dash-dotted lines. The lower half (packet domain) of FIG. 9 depicts packets as generated by an encoder according to the present disclosure, for example the encoder of FIG. 2A, and as received by a decoder, as for example shown in FIG. 2D and used to recover the signal. The upper half (signal domain) shows the deployment of windows in the encoder or decoder. In this example, because of the use of symmetric MDCT windows 231, the windows arrangement for the analysis performed in the encoder and for the synthesis performed in the decoder are identical.

In the following the operation of an embodiment of an encoder according to FIG. 2A is described in reference to FIG. 9.

The first and second frame of size N (from left with regard to the FIG. 9) are used to form an overlapped input signal frame of size 2N, e.g. by buffering and concatenating the input signal frames. With regard to this first overlapped input signal frame the second input signal frame forms the first current input signal frame and the first input signal frame forms the first previous input signal frame. The first overlapped input signal frame is encoded in FD encoding mode using the MDCT window 231 and packetized into the first packet 901 labeled "FD mode". The second input signal frame is buffered for the encoding of the next input signal frame, i.e. the third input signal frame.

The second and third input signal frame of size N (from left with regard to the FIG. 9) are used to form a second overlapped input signal frame of size 2N, wherein the third input signal frame forms the second current input signal frame and the second input signal frame forms now the second previous input signal frame, i.e. previous to the third input signal frame. As the second input signal frame was FD encoded and the third input signal frame is to be TD encoded, a transition from FD coding to TD coding is detected and triggered. Therefore, the second overlapped input signal frame is encoded using the left hand signal path according to FIG. 2B to obtain the packet portion 905 labeled "FD mode with new transform" and the first half of the second current input signal frame according to the right hand signal path of FIG. 2C to obtain the packet portion 907 labeled TFD and the packet portion 909 labeled CELP. The packet portions 905, 907 and 909 are packetized into the second packet 903. The third input signal frame is buffered for the encoding of the next input signal frame, i.e. the fourth input signal frame.

The fourth input signal frame is to be encoded using TD coding. Therefore, the TD coding mode is maintained and the third and fourth input signal frames are processed similar to the central signal path of FIG. 2C. The second half of the buffered third input signal frame (third previous signal frame) and the first half of the fourth input signal frame (third current input signal frame) are split further into halves (sub-frames of the size of a quarter, i.e. N/4, of the input signal frames of size N, splitting not shown in FIG. 2C), wherein these sub-frame halves are TD coded using CELP coding to obtain four further packet portions labeled "CELP". These four packet portions are packetized in the third packet 911. The shift of input signal values of the input signal frames with regard to the packets they are put in is shown by the arrows in FIG. 9.

The fifth input signal frame is to be encoded using FD coding. As the fourth input signal frame was TD encoded and the fifth input signal frame is to be FD encoded, a transition from TD coding to FD coding is detected and triggered. Therefore, a third overlapped input signal frame (formed by the fourth and fifth input signal frame, the fifth input signal frame forming the current input signal frame and the fourth input signal frame forming the fourth previous input signal frame) is encoded using the right hand signal path according to FIG. 2B to obtain the packet portion 921 labeled "FD mode with new transform" and the second half of the fourth previous input signal frame according to the left hand signal path of FIG. 2C to obtain the packet portion 919 labeled TFD and the packet portion 917 labeled CELP. The packet portions 917, 919 and 921 are packetized into the fourth packet 913. The fifth input signal frame is buffered for the encoding of the next input signal frame, i.e. the sixth input signal frame.

The sixth input signal frame is to be encoded using FD coding. Therefore, the FD coding mode is maintained and the fifth and sixth input signal frames are processed according to the central signal path of FIG. 2B using, for example, a conventional MDCT.

In other words, by way of example, in a frequency domain processing mode in a first packet 901, frequency-domain processing or coding may be performed, wherein the MDCT window 231 may be used. In a subsequent packet 903, a transition between frequency-domain coding and time-domain coding may be initiated using the window 101. By way of example, an audio decoder may frequency-domain process the bitstream portion 905 corresponding to the FD coding mode of the received packet 903 using an implementation of the inventive window function and inverse transform as described herein, and may time-domain mode process in advance a TFD bitstream 907 and a CELP bitstream 909. In the subsequent packet 911, time-domain decoding may be performed on the CELP bitstream. Further in the next packet 913, a transition from time-domain to frequency domain may be initiated using window 235 and proceeding similarly as for the transition from frequency-domain to time-domain. Subsequently, in frequency domain mode, MDCT windowing using an MDCT window 231 and frequency domain processing may be employed.

The packetization scheme shown in FIG. 9 allows an efficient packetization and conserves the synchronization between TD and FD coding. Synchronization means that frames will start at multiples of a certain predetermined frame size, in this case multiples of N.

According to some implementation forms, the packetization scheme allows keeping the same frame boundary for the TD and the FD codecs as can be seen from FIG. 9. Thus switching between one and the other does not lead to additional delay.

Assuming the TFD coder, as in reference to FIG. 2C 245, consumes less bits than encoding a full CELP sub-frame (the assumption is 50% less), then one can fit at the time of switching, both the bitstream corresponding to the transition transform 905, and the TFD coded 907 and the first CELP sub-frame 909 of the next frame into one packet. Therefore, at the decoder, one can decode and synthesize one signal frame and a half, i.e. N+N/2 time domain samples, in contrast to decoding only one signal frame, i.e. N time domain samples. Although it is not mandatory to decode them, the additional N/2 signal samples will be buffered and used at the next frame thus allowing a delay jump with respect to the FD codec, as an MDCT can only decode one frame because of the overlap add operation, the N/2 additional buffered time domain output samples will be available at the time of transition back to the FD coding mode since the packet 913 contains a bitstream that allows only decoding of N/2 samples. This arrangement of packetization is advantageous for keeping synchronization between time-domain and frequency-domain coding modes. In USAC synchronization is lost but restored again after switching back. In our case, synchronization is never lost. This is only possible because the time-frequency transform described herein may allow a reduction in the amount of data that needs to be encoded and therefore frees the bit rate to be used (in case of constant bit rate operation, i.e. constant packet size) to encode the TFD sub-frame and the first CELP sub-frame. In certain implementation forms, the TFD sub-frame is just a special CELP sub-frame.

It should be noted that for CELP coding some parameters are shared between the sub-frames. Special measures need to be taken so that in case of packet losses the LPC filter of two frames does not get lost.

According to some implementation forms, the transform described herein may be used for the cases of switching between time-domain and frequency domain coding schemes. It allows a graceful degradation of the frequency resolution and a graceful increase in the time resolution between a FD and a TD codec. The transform itself may efficiently be implemented by using a DCT-IV.

According to some implementation forms, the transform is maximally decimated, therefore contrary to existing techniques. There is no additional data increase. It has a nice and elegant interpretation as a filter-bank with coarser frequency resolution than the MDCT long transform.

Using this transform allows both fast and efficient switching to a time-domain coding. The transform allows also deriving novel packetization for TD and FD codecs multiplexing. Thus TD and FD codec share the same frame boundaries and are totally synchronized. The transform also enables an efficient distribution of the bit rate on TD and FD codecs especially at transition points.

According to some implementation forms, the scheme does not have an impact on the low delay MDCT windows. Because at switching time, a large buffer of look-ahead is available which allows decoding up to 1.5 frames, the new switching ideas fit nicely in the context of low delay MDCT windows.

In the preceding specification, the subject matter has been described with reference to specific exemplary embodiments. It will, however, be evident that various modifications and changes may be made without departing from the broader spirit and scope as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed is:

1. A signal analyzer for processing an overlapped input signal frame comprising 2N subsequent input signal values, the signal analyzer comprising:

a windower to receive the overlapped input signal frame and adapted to window the received overlapped input signal frame to obtain a windowed signal, the windower being adapted to zero M+N/2 subsequent input signal values of the received overlapped input signal frame, wherein M is equal or greater than 1 and smaller than N/2; and a transformer configured to received the windowed signal and adapted to transform the remaining 3N/2−M subsequent windowed signal values of the received windowed signal using N−M sets of transform parameters to obtain a transformed-domain signal comprising N−M transformed-domain signal values.

2. The signal analyzer of claim 1, wherein the window applied to the overlapped input signal frame by the windower comprises M+N/2 subsequent coefficients equal to zero, or, wherein the windower is adapted to truncate the M+N/2 subsequent input signal values.

3. The signal analyzer of claim 1, wherein the overlapped input signal frame is formed by two subsequent input signal frames each having N subsequent input signal values.

4. The signal analyzer (401) of claim 1, wherein each of the N−M sets of transform parameters represents an oscillation at a certain frequency, and wherein a spacing, in particular a frequency spacing, between two oscillations is dependent on N−M.

5. The signal analyzer of claim 1, wherein the sets of transform parameters comprise a time-domain aliasing operation.

6. The signal analyzer of claim 1, wherein the sets of transform parameters are determined by the following formula:

$$d_{kn} = \cos\left(\frac{\pi}{N-M}\left(k+\frac{1}{2}\right)\left(n+\frac{N+1}{2}-M\right)\right),$$

$$k = 0, \ldots, N-M-1, n = 0, \ldots, \frac{3N}{2}-1-M,$$

wherein k is a set index and defines one of the N−M sets of transform parameters, n defines one of the transform parameters of a respective set of transform parameters, and $d_{kn}$, denotes the transform parameter specified by n and k.

7. The signal analyzer of claim 1, wherein the signal analyzer has a time-domain processing mode and a transformed-domain processing mode, wherein the windower is configured to, when switching from the transformed-domain processing mode to the time domain processing mode in response to a transition indicator, window the overlapped input signal frame using a window having N coefficients forming a rising slope, and N/2−M coefficients forming a falling slope as part of the transformed-domain processing mode; and/or wherein the windower is configured to, when switching from the time domain processing mode to the transformed-domain processing mode in response to a transition indicator, window the overlapped input signal frame using a window having N/2−M coefficients forming a rising slope and N coefficients forming a falling slope as part of the transformed-domain processing mode.

8. The signal analyzer of claim 1, wherein the overlapped input signal frame is formed by a current input signal frame and a previous input signal frame, each having N subsequent input signal values, wherein the signal analyzer has a time-domain processing mode and a transformed-domain processing mode, and wherein the signal analyzer is further configured to, when switching from the transformed-domain processing mode to the time domain processing mode in response to a transition indicator, process at least a portion of the current input signal frame according to a time-domain processing mode; and/or wherein the signal analyzer is further configured to, when switching from the time domain processing mode to the transformed-domain processing mode in response to a transition indicator, process at least a portion of the previous input signal frame according to a time-domain processing mode.

9. The signal analyzer of claim 1, wherein the signal analyzer is an audio signal analyzer and the input signal is an audio input signal in the time-domain.

10. A signal synthesizer for processing a transformed-domain signal comprising N−M transformed-domain signal values, wherein M is greater than 1 and smaller than N/2, the signal synthesizer comprising:

an inverse transformer configured to receive the transformed-domain signal and adapted to inversely transform the N−M transformed-domain signal values using 3N/2−M sets of inverse transform parameters to obtain 3N/2−M inverse transformed-domain signal values; and a windower configured to receive the 3N/2−M inverse transformed-domain signal values and adapted to window the received 3N/2−M inverse transformed-domain signal values using a window comprising 3N/2−M coefficients to obtain a windowed signal comprising 3N/2−M windowed signal values, wherein the 3N/2−M coefficients comprise at least N/2 subsequent nonzero window coefficients.

11. The signal synthesizer of claim 10, wherein each of the 3N/2−M sets of inverse transform parameters represents an oscillation at a certain frequency, and wherein a spacing, in particular a frequency spacing, between two oscillations is dependent on N−M.

12. The signal synthesizer of claim 10, wherein the sets of inverse transform parameters comprise an inverse time-domain aliasing operation.

13. The signal synthesizer of claim 10, wherein the sets of inverse transform parameters are determined by the following formula:

$$g_{kn} = \cos\left(\frac{\pi}{N-M}\left(k+\frac{1}{2}\right)\left(n+\frac{N+1}{2}-M\right)\right),$$

$$n = 0, \ldots, \frac{3N}{2}-1-M, k = 0, \ldots, N-M-1$$

wherein n is a set index and defines one of the 3N/2−M sets of inverse transform parameters, k defines one of the inverse transform parameters of a respective set of inverse transform parameters, and $g_{kn}$ denotes the inverse transform parameter specified by n and k.

14. The signal synthesizer of claim 10, wherein the signal synthesizer further comprises:

an overlap-adder adapted to overlap and add the windowed signal and another windowed signal to obtain an output signal comprising at least N output signal values.

15. The signal synthesizer of claim 10, wherein the signal synthesizer has a time-domain processing mode and a transformed-domain processing mode, wherein the windower is configured to, when switching from the transformed-domain processing mode to the time domain processing mode in response to a transition indicator, window the inverse transformed domain signal using a window having N subsequent coefficients forming a rising slope, and N/2−M coefficients forming a falling slope; and/or wherein the windower is configured to, when switching from the time domain processing mode to the transformed-domain processing mode in response to a transition indicator, window the inverse transformed-domain signal using a window having N/2−M coefficients forming a rising slope, and N coefficients forming a falling slope.

16. The signal synthesizer of claim 10, wherein the signal synthesizer is an audio signal synthesizer, wherein the transformed-domain signal is a frequency domain signal and the inverse-transformed domain signal is a time-domain audio signal.

17. A signal analyzing method for processing an overlapped input signal frame comprising 2N subsequent input signal values, the signal analyzing method comprising:

receiving the overlapped input signal frame;

windowing the received overlapped input signal frame to obtain a windowed signal, the windowing comprising zeroing M+N/2 subsequent input signal values of the received overlapped input signal frame, wherein M is equal or greater than 1 and smaller than N/2; and transforming the remaining 3N/2−M subsequent windowed signal values of the windowed signal using N−M sets of transform parameters to obtain a transformed domain signal comprising N−M transformed-domain signal values.

18. A signal synthesizing method for processing a transformed-domain signal comprising N−M transformed-domain signal values, wherein M is equal or greater than 1 and smaller than N/2, the signal synthesizing method comprising:

receiving the transformed-domain signal;

inversely transforming the N−M transformed-domain signal values using 3N/2−M sets of inverse transform parameters to obtain 3N/2−M inverse transformed-domain signal values; and windowing the 3N/2−M inverse transformed-domain signal values using a window comprising 3N/2−M coefficients to obtain a windowed signal comprising 3N/2−M windowed signal values, wherein the 3N/2−M coefficients comprise at least N/2 subsequent nonzero window coefficients.

19. A method for windowing an overlapped input signal frame comprising 2N subsequent input signal values, the method comprising:

receiving the overlapped input signal frame; and zeroing N/2+M subsequent input signal values of the overlapped input signal frame to generate a windowed signal, M being an integer equal or greater than 1 and smaller than N/2 and N being an integer greater than 1.

20. A transformer for transforming an overlapped input signal frame, the transformer configured to receive the overlapping input signal frame and transform 3N/2−M subsequent input signal values of the received overlapped input signal frame using N−M sets of transform parameters to obtain a transformed-domain signal comprising N−M transformed-domain signal values, M being an integer equal or greater than 1 and smaller than N/2 and N being an integer greater than 1.

21. An inverse transformer for inversely transforming a transformed-domain signal, the transformed-domain signal having N-M values, the inverse transformer configured to receive the transformed-domain signal and inversely transform the N-M transformed-domain signal values into 3N/2−M inversely transformed signal values using 3N/2−M sets of inverse transform parameters, M being an integer equal or greater than 1 and smaller than N/2 and N being an integer greater than 1.

* * * * *

UNITED STATES PATENT AND TRADEMARK OFFICE

CERTIFICATE OF CORRECTION

PATENT NO. : 8,682,645 B2
APPLICATION NO. : 13/862655
DATED : March 25, 2014
INVENTOR(S) : Anisse Taleb, Fengyan Qi and Chen Hu It is certified that error appears in the above-identified patent and that said Letters Patent is hereby corrected as shown below:

In the Title: After "SYNTHESIZING" insert -- METHOD --; and

Claims

Claim 21, Column 40, Line 22, after "transformed-domain signal" delete ", the transformed-domain signal".

Signed and Sealed this
First Day of March, 2016

Michelle K. Lee

Michelle K. Lee
*Director of the United States Patent and Trademark Office*